United States Patent
Oka et al.

(10) Patent No.: US 8,948,809 B2
(45) Date of Patent: Feb. 3, 2015

(54) SIGNATURE BASED CONNECTIVITY PREDICTION FOR PORTABLE ELECTRONIC DEVICES

(75) Inventors: Anand Ravindra Oka, Waterloo (CA); Christopher Harris Snow, Kitchener (CA); Ghasem Naddafzadeh Shirazi, Vancouver (CA); Sean Bartholomew Simmons, Waterloo (CA); Gerhard Dietrich Klassen, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 252 days.

(21) Appl. No.: 13/416,639

(22) Filed: Mar. 9, 2012

(65) Prior Publication Data

US 2013/0237278 A1 Sep. 12, 2013

(51) Int. Cl.
H04W 76/00 (2009.01)

(52) U.S. Cl.
USPC .......................................... 455/524; 455/525

(58) Field of Classification Search
CPC ....................................................... H04W 88/08
USPC ................................................ 455/67.11, 524
See application file for complete search history.

(56) References Cited

U.S. PATENT DOCUMENTS

| 6,393,294 | B1 * | 5/2002 | Perez-Breva et al. ....... | 455/456.5 |
|---|---|---|---|---|
| 6,834,194 | B2 * | 12/2004 | Hunzinger ................ | 455/452.2 |
| 8,106,828 | B1 | 1/2012 | Do et al. | |
| 8,509,778 | B2 * | 8/2013 | Buchmayer et al. .......... | 455/436 |
| 8,588,089 | B2 * | 11/2013 | Dottling et al. .............. | 370/252 |
| 8,718,670 | B2 * | 5/2014 | Ringland et al. ........... | 455/456.1 |
| 8,750,617 | B2 * | 6/2014 | Oka et al. ...................... | 382/181 |
| 8,838,106 | B2 * | 9/2014 | Ramasamy et al. .......... | 455/436 |
| 2003/0013454 | A1 * | 1/2003 | Hunzinger .................... | 455/452 |

(Continued)

FOREIGN PATENT DOCUMENTS

| WO | 0034799 A1 | 6/2000 |
| WO | 2005062066 A2 | 7/2005 |
| WO | 2006 117587 A1 | 11/2006 |

OTHER PUBLICATIONS

Haiying Shen et al., "Locality Sensitive Hashing Based Searching Scheme for a Massive Database", Southeastcon, 2008 IEEE, IEEE Piscataway NJ USA, Apr. 3, 2008, pp. 123-128, XP031245568, ISBN: 978-1-4244-1883-1.*

(Continued)

*Primary Examiner* — Hai V Nguyen
(74) *Attorney, Agent, or Firm* — Norton Rose Fulbright Canada LLP

(57) ABSTRACT

Methods of predicting future connectivity of a portable electronic device is described along with systems and devices for implementing the methods. The method includes receiving an indication of a plurality of radio scenes detected at the portable electronic device at different reference times. Each of the plurality of radio scenes identifies transmitters and associated signal strength of signals received by the portable electronic device at the respective reference time. One or more connectivity predictions can be retrieved from a corpus of pairs of a composite signature vector and associated connectivity information. Each of the one or more connectivity predictions can be retrieved based on a similarity between the associated respective composite signature vector and a query composite signature vector. A future connectivity prediction of the portable electronic device can be provided based on the one or more retrieved connectivity predictions.

27 Claims, 13 Drawing Sheets

(56) References Cited

U.S. PATENT DOCUMENTS

| | | |
|---|---|---|
| 2004/0205509 A1 | 10/2004 | Lou |
| 2005/0176442 A1* | 8/2005 | Ju et al. .................. 455/456.1 |
| 2005/0246334 A1* | 11/2005 | Tao et al. ......................... 707/5 |
| 2006/0019679 A1* | 1/2006 | Rappaport et al. ......... 455/456.5 |
| 2006/0183450 A1 | 8/2006 | Cameron |
| 2007/0005589 A1 | 1/2007 | Gollapudi |
| 2007/0139269 A1* | 6/2007 | Chen et al. .................... 342/450 |
| 2008/0004036 A1 | 1/2008 | Bhuta et al. |
| 2008/0076430 A1* | 3/2008 | Olson ......................... 455/440 |
| 2008/0176583 A1* | 7/2008 | Brachet et al. ............. 455/456.3 |
| 2008/0186234 A1* | 8/2008 | Alles et al. .................... 342/451 |
| 2009/0047948 A1* | 2/2009 | Turetsky et al. ........... 455/432.1 |
| 2009/0109095 A1 | 4/2009 | Hido et al. |
| 2009/0210418 A1 | 8/2009 | Arasu et al. |
| 2009/0292751 A1* | 11/2009 | Schneider ................... 708/250 |
| 2010/0085947 A1* | 4/2010 | Ringland et al. ............. 370/338 |
| 2010/0094840 A1 | 4/2010 | Donnelly et al. |
| 2010/0171993 A1 | 7/2010 | Longobardi et al. |
| 2010/0240397 A1* | 9/2010 | Buchmayer et al. ....... 455/456.1 |
| 2011/0044177 A1* | 2/2011 | Nair et al. ..................... 370/241 |
| 2011/0096687 A1* | 4/2011 | Dottling et al. ............... 370/252 |
| 2011/0207459 A1* | 8/2011 | Ramasamy et al. .......... 455/436 |
| 2011/0269479 A1 | 11/2011 | Ledlie |
| 2012/0309416 A1* | 12/2012 | Whelan et al. ............. 455/456.1 |

OTHER PUBLICATIONS

Haiying Shen et al—"Locality sensitive hashing based searching scheme for a massive database", Southeastcon, 2008 IEEE, IEEE Piscataway NJ USA, Apr. 3, 2008, pp. 123-128, XP031245568, ISBN: 978-1-4244-1883-1.

European Search Report from corresponding EP application No. 12158943.6 dated Jul. 16, 2012.

Barker Brettell, Response to extended European Search Report dated Oct. 5, 2012, filed in European Patent Application No. 12158943.6.

United States Patent and Trademark Office, Office Action dated Oct. 11, 2013, issued in U.S. Appl. No. 13/416,538.

Norton Rose Fulbright, Response to Office Action filed Jan. 3, 2014 in U.S. Appl. No. 13/416,538.

* cited by examiner

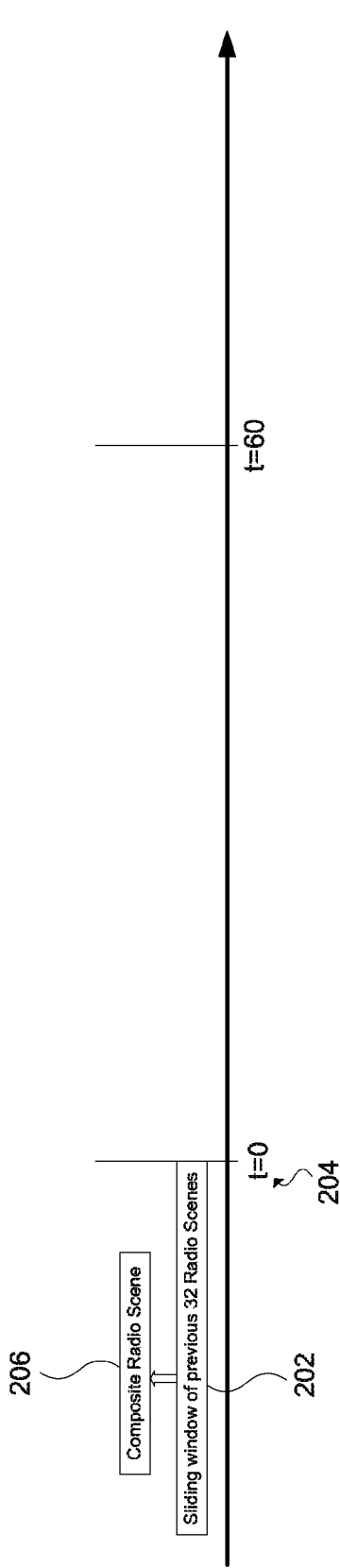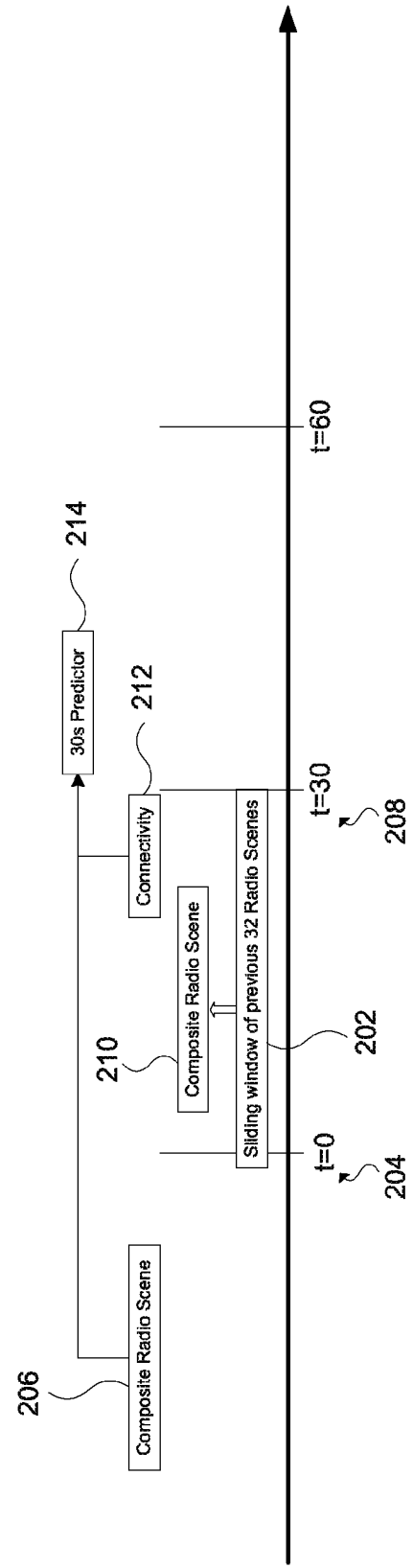

US 8,948,809 B2

SIGNATURE BASED CONNECTIVITY PREDICTION FOR PORTABLE ELECTRONIC DEVICES

TECHNICAL FIELD

The current application relates to systems, devices, and methods of predicting a future connectivity of a portable electronic device and in particular to predicting future connectivity of a portable electronic device based on signatures of radio scenes seen by the portable electronic device.

BACKGROUND

Portable electronic devices or portable electronic devices increasingly have a plurality of different wireless radios. As the portable electronic device moves around, for example as a user of the device travels from home to work, one or more of the radios may gain or lose connectivity. However, as the portable electronic device moves through the environment it is difficult to predict the future connectivity of the portable electronic device.

The portable electronic device may determine one or more connectivity characteristics, such as a signal strength received from a transmitter to predict connectivity, however the received signal strengths are a result of complex interactions with the environment, including for example multipath fading, occlusions and other factors. As a result, it is difficult to use changes in signal strength as a predictor of future connectivity. For example, a decrease in the strength of a received signal does not necessarily mean that connectivity will be lost, as it may be the result of one or more environmental factors which may quickly change.

It would be desirable to be able to provide a prediction of available radio connectivity on a portable electronic device at some time in the future.

BRIEF DESCRIPTION OF THE FIGURES

Further features and advantages of the present disclosure will become apparent from the following detailed description, taken in combination with the appended drawings, in which:

FIGS. 2A to 2C depict timelines of generating future connectivity predictors;

DETAILED DESCRIPTION

Figure 1:
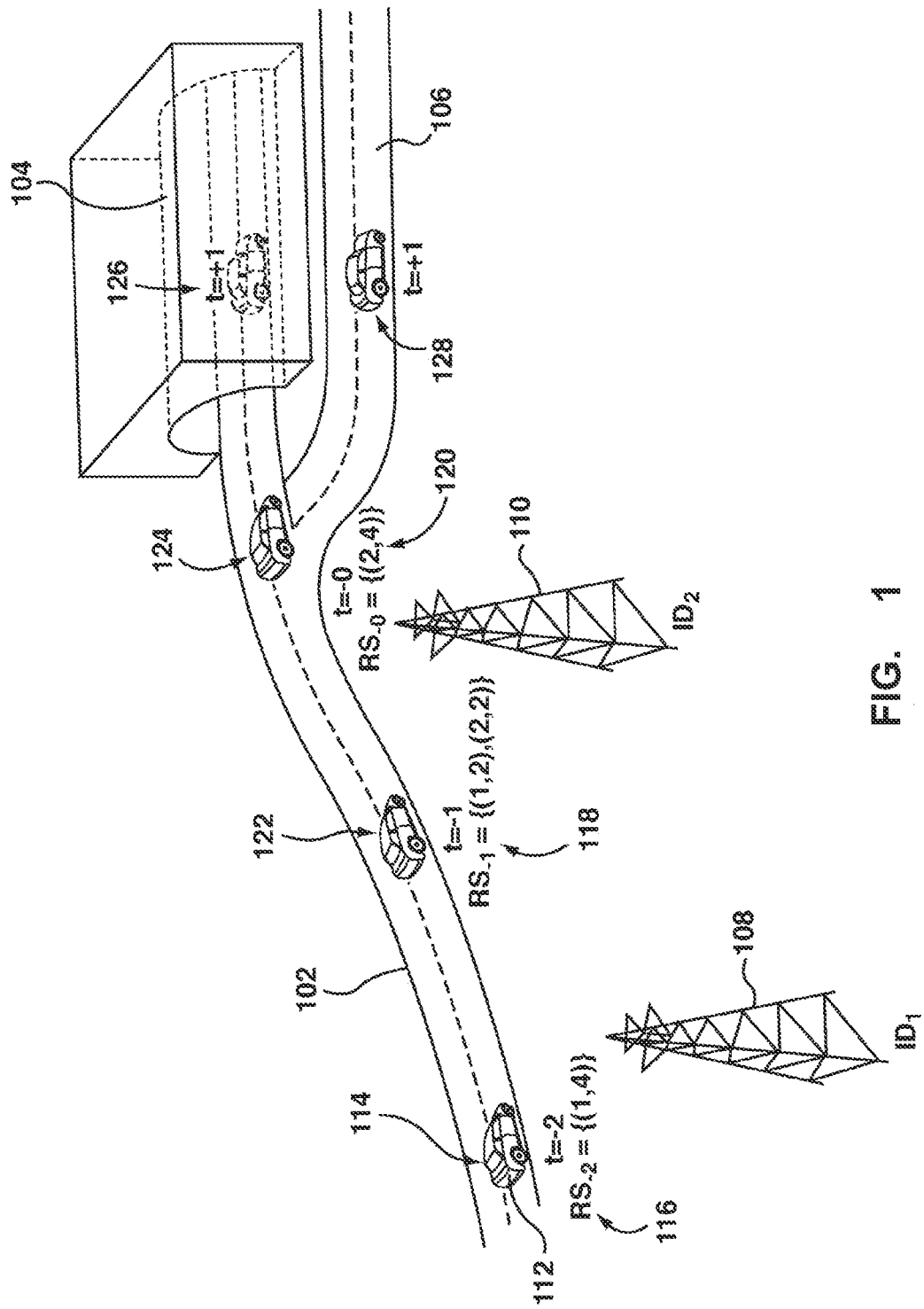
FIG. 1 depicts an illustrative environment in which connectivity prediction may be used.

In accordance with the description, there is provided a method of predicting future connectivity of a portable electronic device comprising: accessing a query composite signature vector providing an indication of a plurality of radio scenes detected at the portable electronic device at respective predetermined reference times, each radio scene identifying transmitters and associated signal strength of signals received by the portable electronic device at the respective reference time; retrieving one or more connectivity predictions from a corpus of pairs of: a composite signature vector, providing an indication of a plurality of radio scenes detected at one or more different portable electronic device at the predetermined reference times, and associated connectivity information, each of the one or more connectivity predictions retrieved based on a similarity between the associated respective composite signature vector and the query composite signature vector; and providing future connectivity prediction of the portable electronic device based on the one or more retrieved connectivity predictions.

In accordance with the description, there is further provided a device for predicting future connectivity of a portable electronic device comprising: a memory for storing containing instructions; and a processor for executing the instructions, the instructions when executed by the processor configuring the device to: access a query composite signature vector providing an indication of a plurality of radio scenes detected at the portable electronic device at respective predetermined reference times, each radio scene identifying transmitters and associated signal strength of signals received by the portable electronic device at the respective reference time; retrieve one or more connectivity predictions from a corpus of pairs of: a composite signature vector, providing an indication of a plurality of radio scenes detected at one or more different portable electronic device at the predetermined reference times, and associated connectivity information, each of the one or more connectivity predictions retrieved based on a similarity between the associated respective composite signature vector and the query composite signature vector; and provide future connectivity prediction of the portable electronic device based on the one or more retrieved connectivity predictions.

In accordance with the description, there is further provided a computer readable memory containing instructions for predicting future connectivity of a portable electronic device, the instructions which when executed by a processor perform the method of: accessing a query composite signature vector providing an indication of a plurality of radio scenes detected at the portable electronic device at respective predetermined reference times, each radio scene identifying transmitters and associated signal strength of signals received by the portable electronic device at the respective reference time; retrieving one or more connectivity predictions from a corpus of pairs of: a composite signature vector, providing an indication of a plurality of radio scenes detected at one or more different portable electronic device at the predetermined reference times, and associated connectivity information, each of the one or more connectivity predictions retrieved based on a similarity between the associated respective composite signature vector and the query composite signature vector; and providing future connectivity prediction of the portable electronic device based on the one or more retrieved connectivity predictions.

An apparatus, system and methods for predicting future connectivity of a portable electronic device are described. The connectivity prediction provides a prediction of whether or not the portable electronic device will have connectivity for one or more of its radios at some particular time in the future. The connectivity prediction uses a corpus of signatures, each associated with future connectivity information. A portable electronic device can provide a signature of its current environment, which is compared to signatures in the corpus and can receive in return future connectivity information associated with one or more signatures stored in the corpus that are close or similar to the provided signature. The device or an application on the device can then determine a course of action based upon the future connectivity information such as buffering of data before connectivity loss or deferring a transaction or request for data until a more suitable connectivity conditions are predicted to be available.

Each signature, whether stored in the corpus or provided as a query of the portable electronic device, is a signature of a series of radio scenes captured by the portable electronic device at subsequent times. As such, each signature captures information about how the portable electronic device is travelling. Signatures can be compared, and if they are similar then it can be assumed that the portable electronic devices associated with the signatures were moving in a similar manner and so the connectivity information they will have at some time in the future may also be similar. If future connectivity information was previously associated with one of the signatures, then it may be used in predicting the future connectivity of the other signature. The future connectivity prediction may be used to provide various functionality. As a simple example, the connectivity prediction may be used to download and cache information if connectivity is expected to be lost in the near future. Further uses of the connectivity prediction are described further herein.

FIG. 1 depicts an illustrative environment in which connectivity prediction may be used. It will be appreciated that FIG. 1 is only one possible example of how the connectivity prediction may be used. Further, the example of FIG. 1 has been simplified for clarity of the description. As depicted, the environment 100 involves an automobile traveling down a road 102. The road 102 enters into a tunnel 104. A second road 106 turns off the road 102 and bypasses the tunnel 104. As depicted in FIG. 1, a number of cellular transmitters 108, 110 are located along the road 102. As an automobile 112 travels down the road 102, a portable electronic device in the automobile, such as a driver's or passenger's portable electronic device, will "see", that is receive, signals from one or more of the transmitters 108, 110. The signals seen by the portable electronic device will include unique identifiers of the transmitters and the portable electronic device associates an indication of the strength of the received signs defined by a metric referred to as a received signal strength indicator (RSSI) value with the transmitter ID. RSSI will be used throughout the description for clarity however the other metrics may be used such as defined by Received Channel Power Indicator (RCPI) or other relative radio frequency signal or channel strength metrics. The transmitter IDs and associated RSSI values provide a radio scene as seen by the portable electronic device at a particular time. In FIG. 1, it is assumed that at time t=0, automobile position 114, that it is desired to predict the future connectivity of the portable electronic device. It is further assumed that there is an existing corpus of previously captured signatures and associated connectivity information captured some known time after the associated signature.

The automobile 112 periodically captures radio scenes, for example once every second. As depicted the automobile captures three different radio scenes 116, 118, 120 at times t=−2, t=−1 and t=0 while the automobile 112 is in position 122, 124 and 114 respectively. At time t=0, a composite signature incorporating the radio scene sequence, 116, 118, 120 is generated and can be compared to previously captured composite signatures that are associated with future connectivity information in the corpus. For simplicity of the description, it is assumed that the automobile's 112 composite signature matches one of the previously stored composite signatures that are associated with future connectivity information, and as such, the future connectivity information associated with the matching composite signature can be provided to the portable electronic device. If the previously stored composite signature was captured by an automobile that subsequently entered the tunnel 104, the connectivity information would indicate that the portable electronic device will likely lose connectivity at time t=+1, when the automobile is at position 126 inside the tunnel 104. If the previously stored composite signature was captured by an automobile that subsequently turned onto the second road 106, the connectivity information would indicate that the portable electronic device will likely still have connectivity at time t=+1, when the automobile is at position 128 on the second road 106 outside the tunnel 106.

It should be appreciated that the above description has been simplified for clarity. The generation of the composite signatures, determination of similar composite signatures, the connectivity information as well as generating the corpus of composite signatures and associated connectivity information is described in further detail below.

Figure 2C:
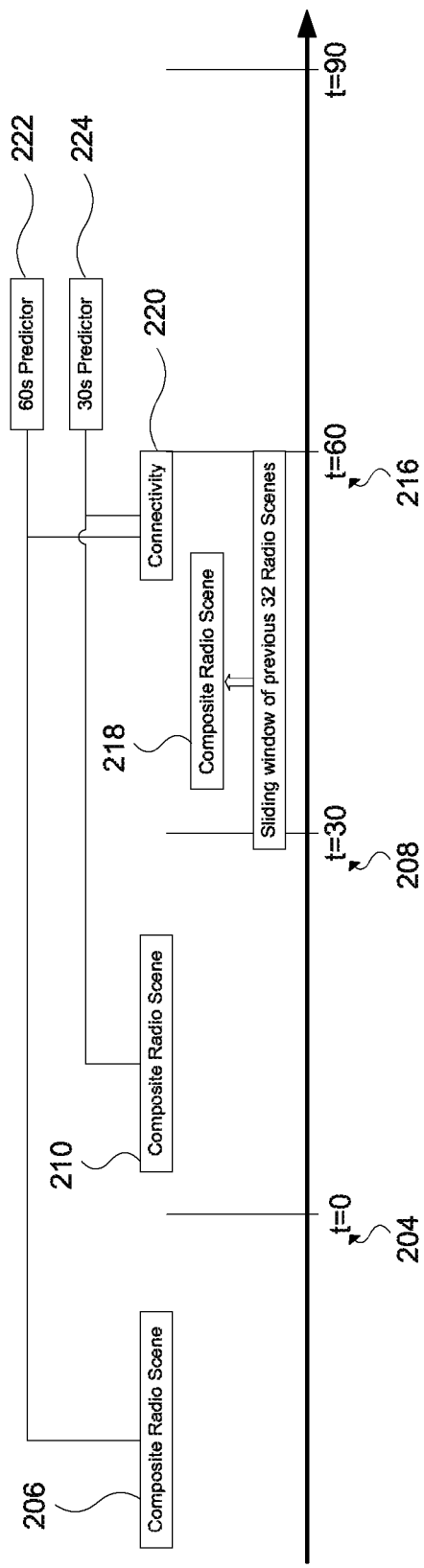

FIGS. 2A to 2C depict timelines of generating future connectivity predictors. The future connectivity predictors may be stored in a corpus and used to provide future connectivity predictions for unknown composite signatures. The corpus described above stores a plurality of connectivity predictors, each of which comprises a composite signature and associated future connectivity information. The future connectivity information provides an indication of previously determined radio connectivity. As will be appreciated, a portable electronic device may have numerous radios such as 2G, 3G, 4G, etc. cellular radios, Wi-Fi radios, WiMax radios, and/or one or more receives such as a GPS receiver. As one example, the future connectivity information could be tuples of values, one for each radio of the portable electronic device, indicating whether connectivity is available or not. The future connectivity information may provide an indication of whether or not each type of radio has connectivity, and possibly an indication of the quality or other characteristics of the connectivity, such as whether or not Wi-Fi access is free or not. Further, FIGS. 2A to 2C depict separate connectivity predictors for different lengths of time into the future the prediction is desired for, namely 30 and 60 seconds. It is contemplated that a single connectivity predictor could provide future connectivity information for multiple different times into the future.

In FIGS. 2A to 2C, it is assumed that a composite signature is based on 32 previous radio scenes captured one second apart. It is contemplated that more or fewer radio scenes could be incorporated into a composite signature. Further, it is contemplated that the radio scenes incorporated into the composite signature do not need to be consecutively captured radio scenes, rather previous radio scenes may be selectively incorporated into the composite signature. For example, the previous radio scenes may be selected based on a geometric sequence, so that the current radio scene as well as the radio scenes visible 1, 2, 4, 8, 16 and 32 seconds ago are incorporated into the composite signature.

Turning to FIG. 2A, radio scenes are periodically captured, one every second. The radio scenes are captured in a sliding window 202 of 32 previous radio scenes. At an initial time 204, t=0, a first composite signature 206 is generated from the previously captured radio scenes. Turning to FIG. 2B, the sliding window 202 progresses as further radio scenes are captured. At time 208, t=30, a second composite signature 210 is generated from the previously captured radio scenes of the updated sliding window 202. Additionally, connectivity information 212 is determined indicating the connectivity status of one or more radios of the portable electronic device. The captured connectivity information 212 is combined with the previously generated composite signature to provide a connectivity predictor 214. As depicted the connectivity predictor 214 will provide a prediction of the connectivity of a portable electronic device 30 second into the future, assuming the composite signature used for the query matches the composite signature 204.

Turning to FIG. 2C, at time 216, t=60, a third composite signature 218 is generated from the sliding window 202 of captured radio scenes. Further, new connectivity information 220 is captured indicating connectivity status of one or more radios of the portable electronic device. The connectivity information 220 is combined with the composite signature 206 captured at time 204, t=0, providing connectivity predictor 222, which may be used in predicting connectivity of the portable electronic device 60 seconds into the future. Additionally, the connectivity information 220 is combined with the composite signature 210 to provide a connectivity predictor 224 that may be used to predict connectivity 30 seconds into the future. The process described above with regards to FIGS. 2A to 2C, may continue generating connectivity predictors every 30 seconds, which may be stored in the corpus used for providing predictions of future connectivity to portable electronic devices.

The above has described generating connectivity predictors every 30 seconds. It is contemplated that the connectivity predictors could be generated more often or less often. Further, it is contemplated that the connectivity predictors could be additionally, or alternatively, generated upon a change in connectivity information.

Once the corpus comprises a sufficient number of connectivity predictors, a portable electronic device may provide a query composite signature, which is then used to retrieve connectivity predictors having similar or close composite vectors. The connectivity information of the retrieved connectivity predictors may be used to predict future connectivity information for the portable electronic device. The portable electronic device may use the provided connectivity information to take various actions based on what the predicted connectivity will be in the future.

The above has described the composite signature as being based on a plurality of radio scenes captured at different times. It is desirable to be able to easily compare composite signatures to each other to determine ones that are similar or close. If the composite signatures are vectors, the comparison may be done quickly using various well known techniques. A composite signature vector may be generated from the different radio scenes captured at different times using a compressed sensing signature technique. For clarity of the description, the compressed sensing signature technique is first described with respect to a single radio scene captured at a particular time. Generating the composite signature vector for a plurality of radio scenes captured at different times is then described in further detail.

Conceptually, a radio scene may be viewed as a representation of a vector. The radio scene comprises a plurality of key-value pairs, with each key being a unique transmitter ID and the value an associated RSSI value. The unique transmitter IDs may be a unique 64 bit value, and as such there may be, for example, a possible $2^{64}$ transmitter IDs. As such, the key-value pairs of the radio scene may be considered as the non-zero valued elements of a sparse radio scene vector, with the value of the elements not in the key-value pairs of radio scene being zero. As will be appreciated, the sparse radio scene vector will have mostly zero valued elements, since only a relatively small number of the possible $2^{64}$ transmitters will be visible by a portable electronic device at a time. Although it is convenient to view the radio scene as a vector as described above, it is impractical to use as a signature since the radio scene vectors would have at least $2^{64}$ elements. Comparing vectors with $2^{64}$ is computationally impractical. As such, it is desirable to generate a signature representation of the radio scene having a lower dimensionality than the sparse radio scene vector.

As described further below, the radio scene signature vectors may be generated using a compressive sensing signature technique, which provides a low dimension signature vector from information that may be represented as a vector in a high dimensional space.

The compressive sensing signature technique is based on compressive sensing techniques. Compressive sensing requires that a measurement matrix of size m×n be known in order to compress a sparse vector, where n is the dimensionality of the sparse vector being compressed and m is the dimensionality of the compressed data. In the case of the radio scene vector, the dimensions of the measurement matrix would be too large, in the order of $2^{64}$, for practical applications, especially on a portable electronic device. However, as described further herein, although the compressive sensing signature technique is based on compressive sensing, it does not require the measurement matrix be known a-priori. Further, advantageously, the compressed sensing signature technique is homomorphic, so that vectors that are close in the high dimensionality space are also close in the compressed sensing signature space.

A radio scene signature vector may be generated from radio scene data of a set of key value pairs, where the keys are drawn from an alphabet of an n-dimensional space. The radio scene data used to generate the radio scene signature vector may comprise a set of non-zero key-value pairs of a sparse radio scene vector that may only exist conceptually. Each key-value pair of the radio scene data comprises a unique identifier, typically a unique identifier of a transmitter, and an associated value indicative of the received signal strength from the transmitter at the portable electronic device.

A radio scene signature vector comprises m elements. The number of elements, m, may be determined based on the dimensionality of the sparse data, and the expected sparsity of the sparse data. As an example, m=32 may provide an acceptable signature in generating radio scene signatures, although other signature sizes are possible. Each of the m elements of the radio scene signature vector is equal to a summation of one or more terms. Each of the one or more terms in the summation is associated with a respective key-value pair of the radio scene and is equal to, or proportional to if a weighting factor is used, the value of the pair multiplied by a pseudo-random number. Each of the pseudo-random numbers used in calculating the summation terms are generated from a seed based on a unique value, which may be the key, of the key-value pair and a unique value associated with the element of the signature being calculated, which may be the index of the signature element being calculated.

Figure 3:
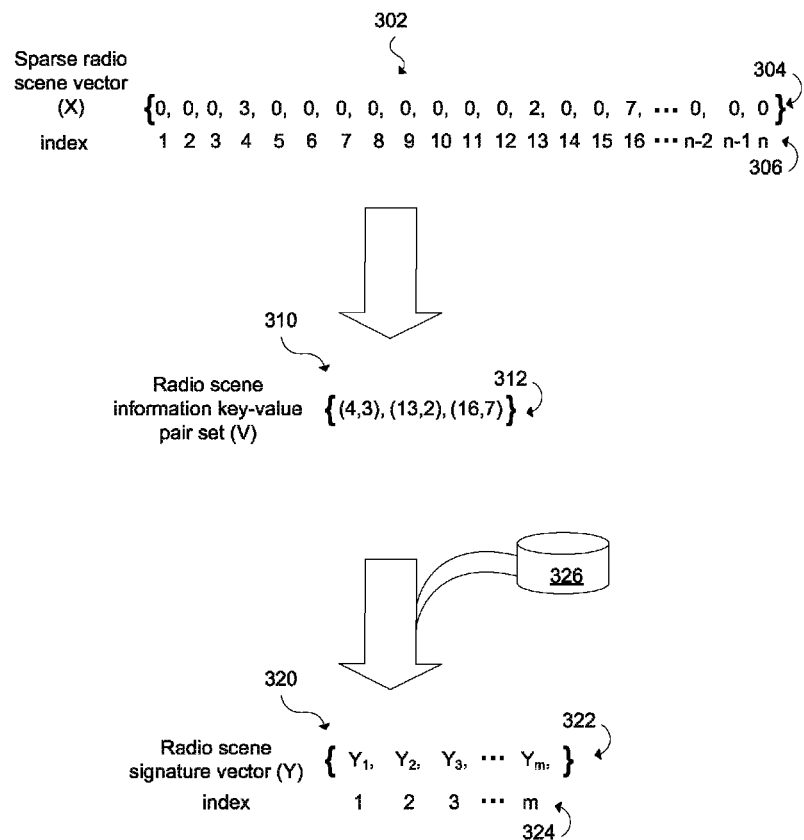
FIG. 3 depicts the various data elements in the compressive sensing signature technique as applied to data corresponding to a radio scene vector that is sparse in its own domain.

FIG. 3 depicts the various data elements in the compressive sensing signature technique as applied to data corresponding to a radio scene vector that is sparse in its own domain. As depicted, there are three types of variables, namely a sparse radio scene vector (X) 302, a radio scene comprising set of key-value pairs (V) 310, and the compressed radio scene signature vector (Y) 320. The sparse radio scene vector has an element for each possible unique transmitter ID and an associated RSSI value. The sparse radio scene vector typically only exists conceptually, since the majority of the elements will be zero-valued and as such do not need to be included explicitly in the representation of the radio scene.

The sparse radio scene vector X has $n=2^{64}$ elements 304, each of which is associated with a unique index 306 such as a unique ID of a transmitter and an RSSI value. The set 310 of key-value pairs V 310 comprises non-zero valued key-value pairs 312 from the sparse radio scene vector X. That is, the set 310 of key-value pairs provides all of the non-zero values of the spares radio scene vector 302. The key of the key-value pair may the index of, or transmitter ID associated with, a non-zero element of X, and the associated value of the key-value pair is the value of the respective element in X, which provides an indication of the strength of the signal received at the portable electronic device from a particular transmitter. As can be seen, the number of key-value pairs in the set V is equal to the sparsity of X, that is the number of non-zero elements of X, which for sparse data will be much smaller than the dimension of X.

The radio scene signature vector Y 320 comprises a number (m) of elements, with m<<n. Each element 322 of the radio scene signature vector Y is associated with an index value 324. The value of each element 322 is calculated based on the key-value pairs in the set V, as opposed to the sparse radio scene vector X, as described further below. The value of each element 322 may also be calculated taking into account synonym information 326 of the different keys, or transmitter IDs.

Since the dimensionality of the radio scene signature vector is much less than the sparse radio scene vector, it is computationally practical to work with. Further, due to the homomorphic nature of the compressive sensing signature technique used to generate the radio scene signature vector from the sparse radio scene vector, the low-dimension signature can be used in place of the high-dimension sparse radio scene vector.

As should be clear, an actual sparse radio scene vector X does not need to be provided to determine the key-value pair set V. Rather, the key-value pair set V can be constructed directly from measurements of received RF signals at the portable electronic device.

Each element of the radio scene signature vector Y can be directly calculated from the set of key-value pairs V, without requiring the large measurement matrix be known a-priori. If the sparse radio scene vector X has s(X) non-zero elements, then the set of key-value pairs V provides a list of s(X) key-value pairs of the form (key K,value P). Since the sparsity of X may vary in different realizations of X, the number of key-value pairs in the set V is described as a function of X, namely s(X). Each element of the radio scene signature vector may be directly calculated as:

$$Y_i = \sum_{l=1}^{s(X)} R(f(i, K_l)) \cdot P_l \cdot G(K_l) \qquad (1)$$

In (1) above, $K_l$ is the key of the $l^{th}$ element's key-value pair in the set V and $P_l$ is the associated value of the $l^{th}$ key-value pair in the set V. $R(f(i,K_l))$ is a value returned from a unit normal (N(0,1)) pseudo-random number generator using a seed of $f(i,K_l)$. It is noted that the pseudo-random number generator will generate the same value when given the same seed value. The function $f(\bullet)$ may be a hash function of the tuple $(i,K_l)$, such as:

$$f(i,K_l)=\text{hash}(str(i)+str(K_l)) \qquad (2)$$

In (2) above str(•) and hash(•) may be common functions for generating a string from a variable, and generating a hash from a string respectively. Further the '+' operator may be the concatenation of strings.

The function $G(K_l)$ in (1) above provides an additional gain function, which may be used to provide flexibility, for example by providing flexibility in deprecating certain elements in the key-value pair set V.

From (1) above, it can be seen that each individual element of the radio scene signature vector Y is calculated as a summation of terms, with each term of the summation calculated from the value of a respective key-value pair multiplied by a pseudorandom number generated based on the key associated with the respective value and a unique value associated with the respective element of the signature vector being calculated. As depicted above in (1), the unique value associated with the respective element of the radio scene signature vector being calculated may be provided by the index of the element being calculated, however other values are possible.

From the above, it is clear that the calculation of the radio scene signature vector Y is done without requiring the generation of the measurement matrix $\Phi$, whose size would be proportional to the dimensionality of the sparse radio scene vector X, which may be extremely large, such as $2^{64}$. As such, the large storage requirement for calculating the radio scene signature vector is eliminated. Further, the calculation of the radio scene signature vector only involves non-zero data, and hence unnecessary multiplication, i.e. multiplication by zero, and calls to the random number generator are avoided, thereby reducing the computational complexity of generating the radio scene signature vector.

Strictly speaking equation (1) above is not an exact implementation of classic compressive sensing radio scene signature technique since the normal variables provided by the pseudo-random number generator are not completely independent of the radio scene data as is the case of the measurement matrix $\Phi$. However, given the benefits of the radio scene signature technique described by (1), any dependence of the normal variables on the radio scene data may be acceptable. Further the dependency is only via the seed, and hence results in only very low level long range correlations that may be virtually undetectable when using an adequate pseudo-random number generator.

Figure 4:
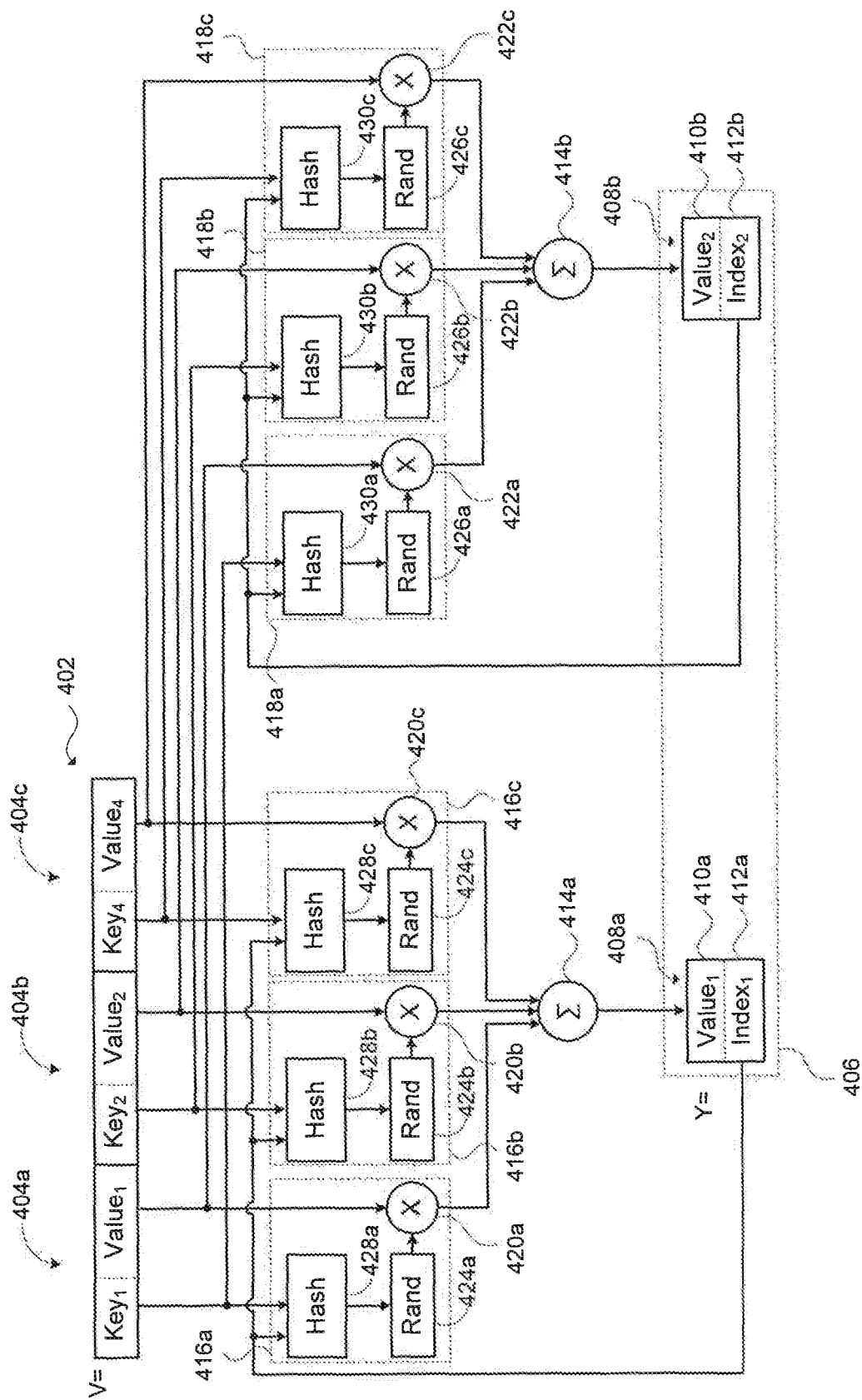
FIG. 4 depicts generating a radio scene signature vector.

FIG. 4 depicts generating a radio scene signature vector. FIG. 4 only depicts calculating two elements of the radio scene signature vector; however, each element of the radio scene signature vector may be calculated in a similar manner.

As depicted in FIG. 4, the key-value pair set V 402 has three elements 404a, 404b, 404c of respective key-value pairs. The radio scene signature vector Y 406 is depicted as having two elements 408a, 408b each having a value 410a, 410b and associated index value 412a, 412b.

As is clear from FIG. 4, each value 410a, 410b of the radio scene signature vector is calculated as a summation 414a, 414b, of a plurality of terms 416a, 416b, 416c and 418a, 418b, 418c respectively. The number of terms in each summation 414a, 414b is equal to the number of key-value pairs in the set V. Each key-value pair in the set comprises an RSSI value and associated unique ID for each transmitter visible from a portable electronic device. Each term 416a, 416b, 416c, 418a, 418b, 418c used in the summation may be calculated as a multiplication 420a, 420b, 420c, 422a, 422b, 422c of a respective value of the respective key-value pair 404a, 404b, 404c of the set V and a random number 424a, 424b, 424c, 426a, 426b, 426c generated from a pseudo-random number generator. The pseudo-random number generator may generate each of the random numbers 424a, 424b, 424c, 426a, 426b, 426c using a respective seed value. Each of the seed values 428a, 428b, 428c, 430a, 430b, 430c may be generated from the key of the respective key-value pairs 404a, 404b, 404c of the set V and the respective index 412a, 412b, or unique identifier, of the element of the radio scene signature vector being calculated.

The process of FIG. 4 is intended to clarify the conceptual generation of the radio scene signature vector, and it should be appreciated that other processes for the generation are possible. For example, each term used in the summation is depicted as being calculated in parallel; however, it is contemplated that the terms could be calculated sequentially. Further, the multiplication of the random numbers by the respective values could be accomplished by adding the random numbers together a respective number of times based on the value. Further, although not depicted in the figure, the calculation of each term could include a weighting factor determined based on the key associated with the term.

Figure 5:
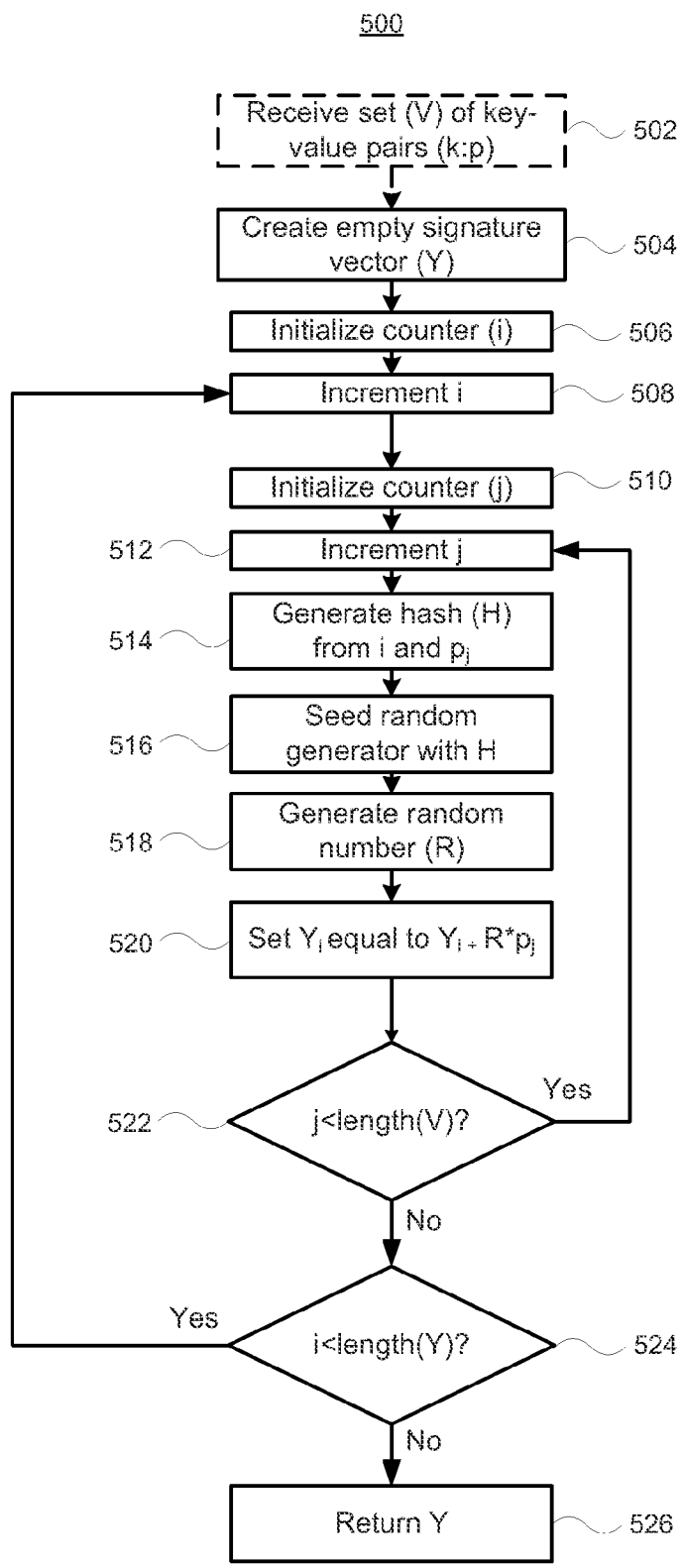
FIG. 5 depicts a method of generating a radio scene signature vector.

FIG. 5 depicts a method of generating a radio scene signature vector. The method 500 may be used to generate a radio scene signature from a radio scene comprising a set of key-value pairs V. The set V may comprise the RSSI values and associated unique IDs of each transmitter that is visible from a portable electronic device. The set V comprises at least one key-value pair, wherein each key is a respective index or identifier of a transmitter and the associated value is an RSSI value of the particular transmitter.

The set of key-value pairs V comprising one or more key-value pairs may be received (502), which may include retrieving the data for example from a storage device. The set V has k pairs, where k>=1. The method 500 creates an empty radio scene signature vector (Y) of m elements (504). The empty radio scene signature vector Y has m zero-valued elements initially. The method initializes a first counter (i) (506). The counter (i) is used to loop over each element in the radio scene signature vector Y and calculate the element's value. Once the counter is initialized, it is incremented (508). It is noted that in the method 500 the counter (i) is initialized to one less than the first index of the radio scene signature vector Y so that when it is incremented, the first element of the radio scene signature vector Y will be referenced. Further, it is noted that the initialization and incrementing of the counter (i) may be done implicitly, for example by using a 'for-next' loop, or other programmatic means. Once the first counter (i) is initialized/incremented, a second counter (j) is similarly initialized (510) and incremented (512). The second counter (j) is used to loop over each element in the set V to calculate the summation terms from the key-value pairs of the set V.

Once the second counter (j) is initialized/incremented a hash (H) is generated from the concatenation of the value of the first counter (i) and the key of the j-$^{th}$ key-value pair of the set V (514). Once the hash (H) is calculated, it is used as the seed for a random number generator (516), and a pseudo-random number (R) is generated from the seeded random number generator (518). Once the random number (R) is generated, the i$^{th}$ element of the signature vector V, which was initialized to zero, is set equal to $Y_i + R \cdot p_j$, where $p_j$ is the value of the j$^{th}$ key-value pair of the set V (520). Once the terms have been summed, it is determined if the second counter (j) is less than the number of key-value pairs in the set V (522). If the counter (j) is less than the number of elements in the set V (Yes at 522), then there are further elements in the set V to use in calculating the element in the signature vector Y and the method returns to increment the second counter (j) and proceeds to incorporate the next key-value pair from the set V in the calculation of $Y_i$. If the counter (j) is not less than the number of elements (No at 522), than there are no more key-value pairs in the set V to use in calculating $Y_i$ and the method determines if the first counter (i) is less than the number of elements in the radio scene signature vector Y (524). If the counter (i) is less than the number of elements in the radio scene signature vector Y (Yes at 524), then there are further elements of the radio scene signature vector Y to calculate and the method increments the first counter (i) (510) and calculates the value of the next element of the radio scene signature vector Y. If the first counter (i) is not less than the number of elements in the signature vector Y (No at 524), then all of the elements of the radio scene signature vector Y have been calculated and the radio scene signature vector Y is returned (526).

The method 500 described above may generate a radio scene signature vector from a set of key-value pairs of radio scene information of the transmitters visible from a portable electronic device.

The radio scene signature vector described above treats each unique index or key in the key-value set as a separate unrelated transmitter. However, it is possible that some transmitters are located in the same location, for example on the same tower. It could be desirable to be able to incorporate the information of similarly located transmitters. This can be achieved through the use of synonym information indicating which transmitters, or more particularly which transmitter IDs, are located in the same or similar locations. The synonym information may then be used to generate the same signature for the different transmitter IDs. As such, the radio scene signature vector may be generated with aliasing across similarly located transmitter IDs.

When generating radio scene signatures with aliasing, it is necessary to have some indication of the similarity between elements within the sparse data space. For example, it is desirable to know that a transmitter having a particular transmitter ID is located on the same physical tower as another transmitter having a unique transmitter ID. This synonym information may be provided separately, or in some cases may be provided by the unique IDs. For example, in cellular networks, transmitter IDs that have a similar location typically have IDs that differ only in the last 16 least significant bits.

Figure 6:
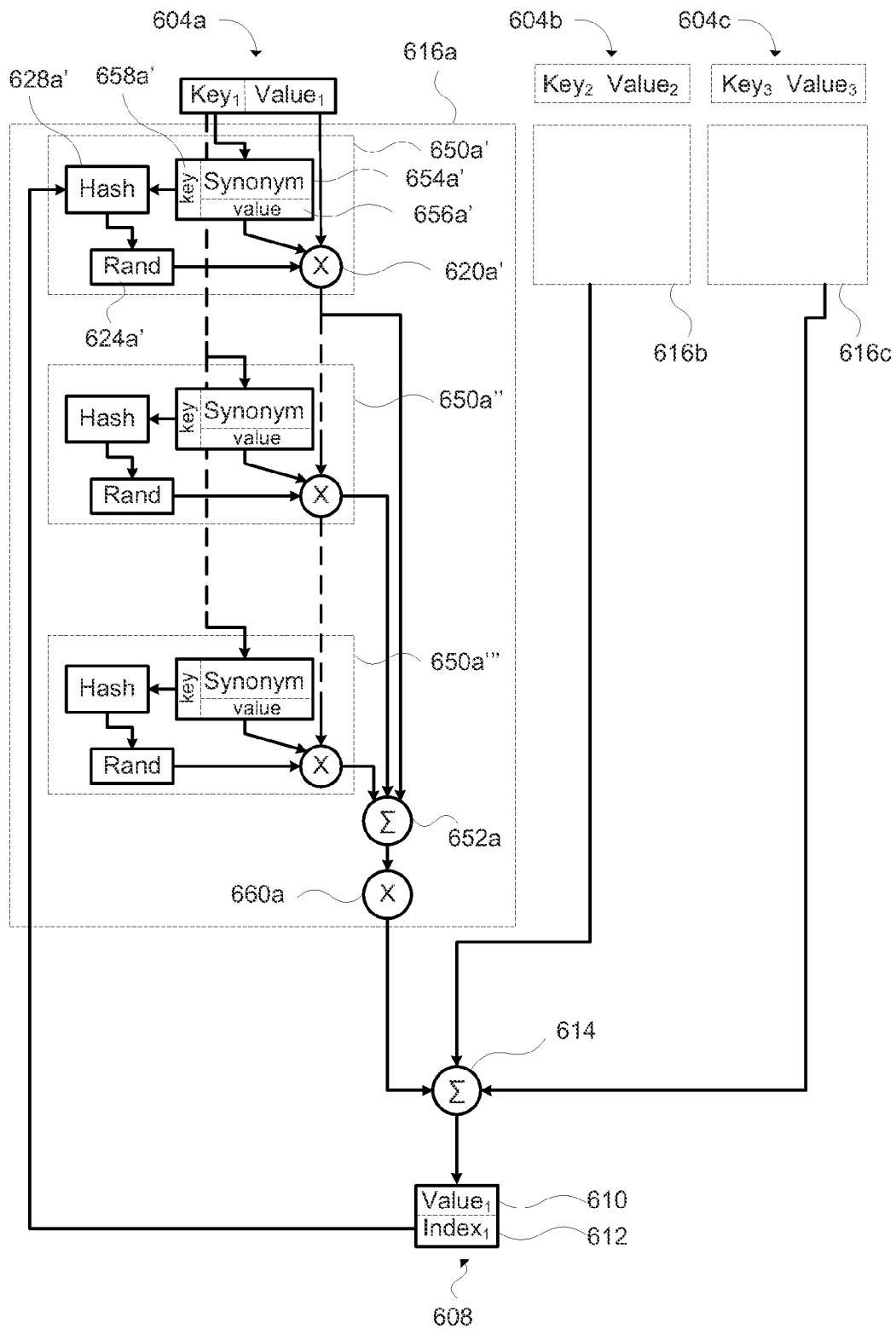
FIG. 6 depicts schematically the generation of a radio scene signature vector with aliasing.

FIG. 6 depicts schematically the generation of a radio scene signature vector with aliasing. FIG. 6 only depicts the calculation of a single term 616a used in the summation 614 for one element 608 of the radio scene signature vector. Each of the other terms 616b, 616c could be calculated in a similar manner as shown for term 616a. Similar to the above, each term 616a, 616b, 616c corresponds to a key-value pair of the set being processed. Although three key-value pairs are depicted in FIG. 6, it will be appreciated that fewer or additional terms may be used in the summation 614 for the element of the radio scene signature depending on the number of key-value pairs in the set being processed.

As described above, each term in the summation of a signature element is determined using a respective key-value pair from the set of key-value pairs. When determining the terms for radio scene signatures using aliasing, terms of key-value pairs having no synonym are calculated in the same manner as described above. However, if the key-value pair has one or more synonyms, then the term is calculated as a summation of terms based on each of the synonymous terms.

In FIG. 6, it is assumed that there is some synonym information that indicates that a particular index is synonymous with two other indices. For example, it is assumed that there is some synonym information indicating that there are three transmitters located on a single tower. The synonym information could be stored in various ways. For example, the synonym information could be stored as a matrix with unique transmitter IDs acting as indices of both axes and the elements of the matrix indicating a synonym weighting value between respective transmitter IDs. Further the synonym information could be provided by a plurality of tuples, or lists of synonymous transmitter IDs, that is transmitter IDs that are physically located together or close together.

As depicted, the term 616*a* for key-value pairs having synonyms may be calculated as a summation 652*a* of sub-terms 650*a*', 650*a*'', 650*a*'''. Each of the sub-terms is calculated in a similar manner as described above for the individual terms, however, rather than using the key-value pair, each sub-term 650*a*', 650*a*'', 650*a*''' is calculated using a respective synonym of the key-value pair. As such, the number of sub-terms 650*a*', 650*a*'', 650*a*''' used in calculating the term 616*a* may be determined based on the number of synonyms that exist for a particular word. Further, when considering synonyms, the key-value pair may be considered to be synonymous with itself.

Turning to the calculation of the sub-term 650*a*', as can be seen, the calculation of the sub-term 650*a*' is similar to the calculation of individual terms 416*a* described above with reference to FIG. 4, however, instead of using the key of the key-value pair, the key of the synonym is used. It is noted that one of the synonyms would include the key itself. The synonym information is used to determine a key 658*a*' of the synonym 656*a*' associated with the key (Key$_1$) of the key-value pair 604*a*, and a synonym weighting value 656*a*'. The synonym weighting value 656*a*' may be used to provide for soft synonyms, that is synonyms that have a similar meaning, but not exact. If the application only requires exact synonyms, the synonym weighting value 656*a*' does not need to be used as it can be assumed to 1. In the context of radio scene signatures, the synonym weighting may be used to provide an indication of how close physically two, or more, transmitters are.

Once the key 658*a*' of the synonym 654*a*' is determined it may be used to generate a hash value along with the index value 612 of the element 608 of the signature vector being calculated. Similar to the hashes described above, the hash 628*a*' may be generated using a concatenation of the index value 612 of the signature element and the synonym key 658*a*'. The generated hash value may then be used to seed a pseudo-random number generator. The sub-term 650*a*' is then calculated as the product of the generated pseudo-random number, the synonym weighting value 656*a*' and the value (Value$_1$) of the key-value pair.

Each of the other key-value pairs 650*a*'', 650*a*''' may be determined in a similar manner; however, the synonym key values and the synonym weighting values used are associated with different synonyms of the key-value pair. Once the sub-terms 650*a*', 650*a*'', 650*a*''' associated with each synonym is determined they can be summed together. The sum of the sub-terms 650*a*', 650*a*'', 650*a*''' may then be normalized. The summation of the sub-terms can be normalized by dividing the summation by a summation of the weighting values of the synonyms of each sub term. If only exact synonyms are allowed, this results in dividing the summation of the sub-terms by the number of synonyms. Once the term 616*a* is determined as the normalized sum of the synonym sub-terms, it can be summed with the other terms 616*b*, 616*c* to provide the element of the signature vector. The other terms 616*b*, 616*c* may be calculated in a similar manner as described above with term 616*a* if the associated key-value pair has synonyms. Alternatively, the terms 616*b*, 616*c* may be calculated as described above with reference to FIG. 4 or FIG. 5 if there are no synonyms.

It will be appreciated that the particular calculation of a radio scene signature with aliasing described above, is only a single possible way to generate the radio scene signature. That is, the particular order of the operations, such as multiplication and addition of the various values can be reordered as well understood, while still providing a compressive sensing signature. Generally, an m-dimensional radio scene signature with aliasing across synonyms can be determined according to:

$$Y_i = \sum_{l=1}^{S(V)} \frac{\sum_{r=1}^{nS(k_l)} [R(f(i, sk_{l,r}))sw_{l,r} \cdot p_l \cdot G(k_l)]}{\sum_{r=1}^{nS(k_l)} sw_{l,r}}, \text{ for } i = 1, 2, 3, \ldots, M \quad (3)$$

Where:

$Y_i$ is the $i^{th}$ element of the radio scene signature.

S(V) is the sparsity of the data being processed, that is the number of key-value pairs in the radio scene for which the signature is being generated.

$nS(k_l)$ is the number of synonyms associated with the $l^{th}$ key ($k_l$) of the key-value pair.

R(x) is a pseudo-random number generated from a seed x.

$f(i, sk_{l,r})$ is a hashing function of the concatenation of i and $sk_{l,r}$.

$sk_{l,r}$ is the key associated with the $r^{th}$ synonym of the $l^{th}$ key $k_l$.

$sw_{l,r}$ is the synonym weight value associated with the $r^{th}$ synonym of the $l^{th}$ key ($k_l$).

$p_l$ is the $l^{th}$ value in the set of the key-value pairs.

$l^{th}$ is a weighting factor associated with the $l^{th}$ key ($k_l$) in the set of the key-value pairs.

Figure 7:
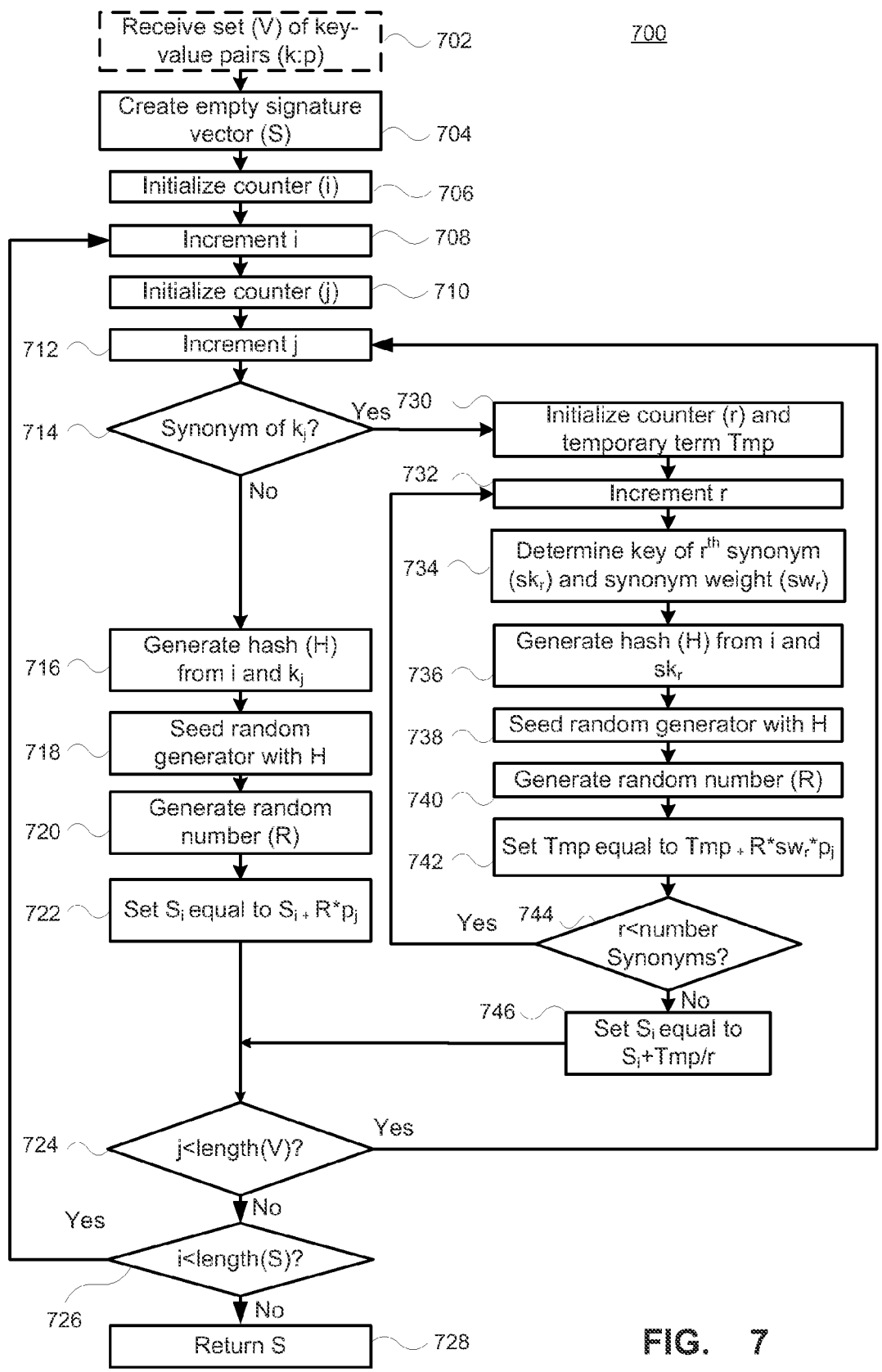
FIG. 7 depicts an illustrative method of generating a compressive sensing signature with aliasing across synonyms.

FIG. 7 depicts an illustrative method of generating a compressive sensing signature with aliasing across synonyms. The method 700 is similar to the method 500 described above with reference to FIG. 5 when the key of the key-value pair being processed is not associated with any synonyms.

The method 700 begins when a set of one or more key-value pairs is received (702). The set of key-value pairs has k non-zero elements, where k>=1. The method 140 creates an empty signature vector (Y) of m elements (704). The empty signature vector (Y) has m zero-valued elements. The method initializes a first counter (i) (706). The counter (i) is used to loop over each element in the signature vector (Y) and calculate the element's value. Once the counter is initialized, it is incremented (708). It is noted that the counter (i) is initialized to one less than the first index of the signature vector (Y) so that when it is incremented, the first element of the signature vector (Y) will be referenced. Further, it is noted that the initialization and incrementing of the counter (i) may be done implicitly, for example by using a 'for-next' loop or other programmatic functionality. Once the first counter (i) is initialized/incremented, a second counter (j) is initialized (710) and incremented (712). The second counter (j) is used to loop through each of the key-value pairs in the set to calculate the summation terms associated with the respective key-value pairs.

Once the second counter (j) is initialized/incremented, it is determined if the $j^{th}$ key-value in the set has any synonyms (714). The determination as to whether there are any synonyms may be made be searching the synonym information for the respective key. If there are no synonyms associated with key (No at 714) a hash (H) is generated from the concatenation of the first counter (i) and the $j^{th}$ key of the set key-value pairs (716). Once the hash (H) is calculated, it is used as the seed for a random number generator (718), and a random number (R) is generated from the seeded random number generator (720). Once the random number (R) is generated, the $i^{th}$ element of the signature vector Y, which was initialized to zero is set equal to $Y_i+R*p_j$, where $p_j$ is the value of the $j^{th}$ key-value pair in the set of key-value pairs (722). Once the terms have been summed, it is determined if the second counter (j) is less than the number of pairs in the set of key-value pairs (724). If the counter (j) is less than the number of pairs in the set, there are further pairs in the set to use in calculating the element in the signature vector (Y). When the counter (j) is less than the number of pairs in the set (Yes at 724), the method returns to increment the second counter (j) (712) and proceeds to incorporate the next key-value pair in the set in the calculation of $Y_i$. If the counter (j) is not less than the number of key-value pairs in the set (No at 724), then there are no further pairs in the set to use in calculating $Y_i$ and the method determines if the first counter (i) is less than the number of elements in the signature vector (Y) (726). If the counter (i) is less than the number of elements in the signature vector (Y) (Yes at 726), then there are further elements of the signature vector (Y) to calculate and the method increments the first counter (i) (708) and calculates the value of the next element of the signature vector (Y). If the first counter (i) is not less than the number of elements in the signature vector (Y) (No at 726), then all of the elements of the signature vector (Y) have been calculated and the signature vector (Y) is returned (728).

Returning to the determination of if there are any synonyms associated with the $j^{th}$ key (714), if there are associated synonyms (Yes at 714), then the element of the signature vector is calculated based on the synonyms. A further counter (r) is initialized along with a temporary term (Tmp) for holding the summation of synonym terms and a temporary term (TmpW) for holding a summation of synonym weights (730). The counter (r) is used to loop over each of the synonyms associated with the key. The counter is incremented (732). Once the counter (r) is incremented, the key ($sk_r$) and the synonym weight value ($sw_r$) of the $r^{th}$ synonym is determined (734). A hash (H) is then generated from the concatenation of the first counter (i) and the key of the $r^{th}$ synonym (736). Once the hash (H) is calculated, it is used as the seed for a random number generator (738), and a random number (R) is generated from the seeded random number generator (740). Once the random number (R) is generated, the temporary terms (Tmp) and (TmpW), which were initialized to zero are set equal to $Tmp+R*sw_r*p_j$, and $TmpW+sw_r$ respectively, where $sw_r$ is the synonym weighting value of the $r^{th}$ synonym and $p_j$ is the value of the $j^{th}$ key-value pair in the set of key-value pairs (742). It is then determined if the counter r is less than the number of synonyms (744) and if it is (Yes at 744) the method returns to increment the counter r (732). If the counter (r) is not less than the number of synonyms (No at 744), then the temporary term (Tmp) is normalized by dividing by the sum of the synonym weights, which is provided by (TmpW). The $i^{th}$ element of the signature is the set equal to the value of the $i^{th}$ element of the signature plus the normalized temporary term Tmp (746) and the method determines if there are further pairs in the set of key-value pairs (724).

As described above, a compressed sensing signature vector may be generated that provides aliasing over synonyms. Aliasing may be used in generating compressive sensing signatures for use in localization in cellular networks. Let datum $V=\{T_l,J_l\}_{l=1}^{S(V)}$ be the set of (TowerID, RSSI) pairs of all the $S(V)$ cell towers seen by a hand-held device at one point in time. A tower ID $T_l$ is an integer of 64 bits. The 16 least significant bits (LSB) correspond to a LAC field of the ID. Towers that are no more than a few hundred meters apart tend to differ only in these LAC bits. The RSSI is a positive real value in Watts indicative of the received signal strength. The aliased compressive sensing signature of V is given by:

$$Y_i = \sum_{l=1}^{S(V)} \sum_{t=T_l-3\sigma}^{} R(f(i,t)) \exp^{-\frac{(t-T_l)^2}{2\sigma^2}} \cdot J_l \text{ for } i=1,2,3,\ldots,m \quad (4)$$

In the above, the fixed parameter a allows control of the synonymity between a transmitter ID $T_l$ and other transmitter IDs that are close to it on the integer line. This type of synonymity may be reasonable since, as described above, transmitter with close IDs usually also have close physical proximity. Setting σ close to zero will remove the synonym property from the signature.

The term exp $$\exp^{-\frac{(t-T_l)^2}{2\sigma^2}}$$

captures the synonimity of transmitter t to tower $T_l$. If the integer value of the transmitter ID t is close to the integer value of the transmitter ID $T_l$, the synonimity is relatively large, while synonimity decays fast when t is very different from $T_l$. Since changing the least significant bits (LSBs) cause small changes in a number while changing the most significant bits (MSBs) cause large changes, t will be close to $T_l$ as an integer when the MSBs agree, and far away otherwise. And, as described above, transmitters with similar MSBs are also usually located in close proximity physically to each other, by convention.

It is contemplated that the synonym and synonym weighting value of a particular element may be determined from the element using a formula as opposed to retrieving the information from a data structure.

The above has described illustrative ways of generating a low dimensional signature vector representation from a high dimensional data vector using a compressive sensing signature technique. In particular, a radio scene signature vector was described as being generated from a single radio scene. The radio scene signature generation technique described above can be extended to generate a composite signature of a plurality of radio scenes captured at different times. The composite signature may be considered as providing some indication of the portable electronic device's location over time, that is the movement of the portable electronic device, and so be used to provide some prediction of future connectivity of the portable electronic device.

A composite signature is generated based on a number of radio scenes captured by a portable electronic device. The composite signature will be generated using radio scenes captured at predetermined reference times. For example a composite signature can be generated from the current radio scene and radio scenes captured 1, 2, 4, 6, 8, 16 and 32 seconds in the past. As new radio scenes are captured, the previously captured radio scenes slide down and are used in generating a new composite signature.

The reference time information, which provides an indication as to when a radio scene was captured, needs to be included in the calculation of the composite signature, otherwise no time information would be incorporated into the composite signature. The reference time information may be incorporated into the calculation in various ways. The composite signature could be generated from sparse vector that is a concatenation of the radio scene vectors of the appropriate reference times. For example, assuming that the radio scene vector has dimension $2^{64}$ and that the composite vector is generated from two radio scenes, for example the current radio scene and one captured 30 seconds ago, the composite vector can be considered as a vector of dimension $2^{128}$, with the current radio scene vector in the first 64 elements, and the previously captured radio scene vector in the last 64 elements. As such, the composite vector could be calculated from the set of key value pairs of the radio scene, however, when the radio scene is from 30 seconds ago, the value of the keys would need to be modified to reflect the shifted position within the composite vector. Once the keys were updated for the previously captured radio scenes, the composite signature could by generated in the same manner as described above. As a further example, the reference time information may be included in generating the seed value of the pseudo random number generator. As such, even if the radio scene at each reference time is the same, the contribution of each reference time, or reference time identifier, to the signature vector element will differ.

Figure 8:
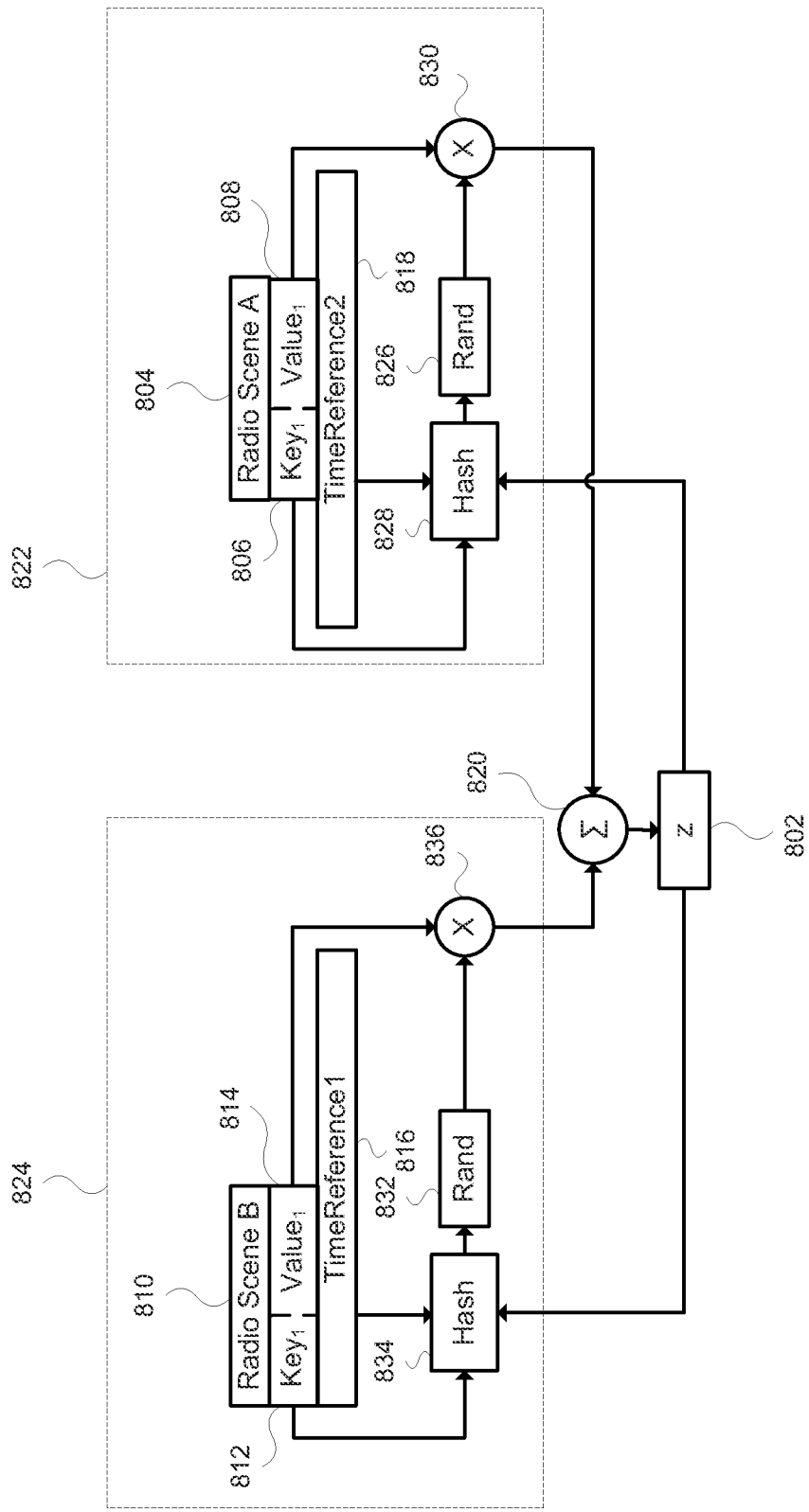
FIG. 8 depicts schematically the generation of a composite signature vector by including reference time information in the seed.

FIG. 8 depicts schematically the generation of a composite signature vector by including reference time information in the seed. As previously described above, a signature vector element is calculated as a sum of terms, each generated using a pseudo random number that is seeded with a value based on the respective key of the key-value pair and an identifier of the signature element being calculated. As is apparent from FIG. 8, the calculation of an element of the composite signature is similar; however the seed is generated based on the key of the key value pair, the identifier of the signature element being calculated and an unique identifier of the reference time.

In the further description of FIG. 8, it is assumed that a new composite signature (z) 802 is generated every 30 seconds. The composite signature 802 is generated from the currently captured radio scene and the radio scene captured 30 seconds ago. Similarly in FIG. 8 it is assumed that a new radio scene is captured every 30 seconds. As depicted, Radio Scene A 804 was captured 30 seconds ago and Radio Scene B 810 was just captured. Radio Scene A 804 may comprise zero or more pairs keys 806 and associated values 808, which may correspond to the transmitter IDs and RSSI values as described above. Similarly, Radio Scene B 810 may comprise zero or more pairs of keys 812 and associated values 814.

When the composite signature 802 is generated, the radio scene 810 associated with reference time 1 816 and the radio scene 804 associated with reference time 2 818 are used in the calculations. The generation of each element in the composite signature is similar to that described above for a single radio scene, however the random number calculated for each key in the radio scene is further based on the reference time identifier. As such, each element of the composite signature, may be the summation 820 of individual reference time terms 822, 824. Each reference time term 822, 824 is generated from the radio scene vector associated with the respective reference time. Each reference time term is generated in a similar manner as the radio scene signature vector above, however the seed used to generate the pseudo random number is further based on a unique identifier associated with the respective reference time. For example, assume that the Radio Scene A 804 is equal to the single key value pair: {(24, 8)} and Radio Scene B 810 is equal to the single key value pair {(36, 4)}. Further, assume that the unique identifier associated with each reference time is simply the respective strings "ReferenceTime1" and "ReferenceTime2". Then the first element of the composite signature vector, which may have a unique identifier of '1', could be the sum 820 of two terms 822, 824. The first term 822 is associated with reference time 2, and the pseudo random numbers 826 used in generating the first term are based on seeds generated from a hash 828 of the keys of the radio scene, in the example above '24', the unique identifier of the signature element being calculated, in the example above 1, and the unique identifier of the reference time, in the example above "ReferenceTime2". A pseudo random number is generated for each key value pair in the radio scene of the reference time, although only a single pair is depicted in FIG. 8. Each of the pseudo random numbers may be multiplied 830 by the associated value and summed. Similarly the second term 824 is associated with reference time 1, and the pseudo random numbers 832 used in generating the second term are based on seeds generated from a hash 834 of the keys of the radio scene, in the example above '36', the unique identifier of the signature element being calculated, in the example above 1, and the unique identifier of the reference time, in the example above "ReferenceTime1". A pseudo random number is generated for each key value pair in the radio scene of the reference time, although only a single pair is depicted in FIG. 8. Each of the pseudo random numbers for the reference time may be multiplied 836 by the associated value and summed. The individual reference time terms 822, 824 may then be summed to provide the signature element's value.

As will be appreciated, the various techniques of calculating the radio scene signature vector described above may be applied to calculating composite signature vectors by incorporating an appropriate reference time identifier when generating the pseudo random numbers.

From the above, a radio scene seen at reference time $\tau$ may be defined to be a set of $s^{(\tau)}$ key value pairs:

$$v^{(\tau)} \equiv \{(t_k^{(\tau)}, r_k^{(\tau)})\}_{k=1}^{s^{(\tau)}} \tag{5}$$

Similarly, a radio scene seen $\alpha$ seconds before reference time $\tau$ may be defined by:

$$v^{(\tau-\alpha)} \equiv \{(t_k^{(\tau-\alpha)}, r_k^{(\tau-\alpha)})\}_{k=1}^{s^{(\tau-\alpha)}} \tag{6}$$

If it is assumed that for every reference time $\tau$, the radio scenes are available for that reference time $\tau = \tau - \psi_0$, where $\psi_0 = 0$ by convention, as well as T past reference times $\tau - \psi_1$, $\tau - \psi_2, \ldots, \tau - \psi_T$, then the composite radio scene can be provided by:

$$v = \{v^{(\tau-\psi_0)}, v^{(\tau-\psi_1)}, \ldots, v^{(\tau-\psi_T)}\} \tag{7}$$

A composite signature vector z of dimension m may be provided for the composite radio scene v by:

$$z_i(v) = \Sigma_{l=0}^{T} \Sigma_{k=1}^{s^{(\tau-\psi_l)}} R(\rho(i, t_k^{(\tau-\psi_l)}, l)) r_k^{(\tau-\psi_l)}, \text{for } i=1, 2, \ldots, m \tag{8}$$

Where:

T is the number of past reference times include in composite signature z.

$R(\rho(i, t_k^{(\tau-\psi_l)}, l))$ is a pseudo-random Gaussian variable generator working from the seed $\rho(i, t_k^{(\tau-\psi_l)}, l)$, which is a function of the element number i, the tower ID $t_k^{(\tau-\psi_l)}$ seen at a past reference time, and an identifier of the past reference time l. The seed may be provided by for example:

$$\rho(i, t_k^{(\tau-\psi_l)}, l) \equiv \text{hash}(\text{str}(i) + \text{str}(t_k^{(\tau-\psi_l)}) + \text{str}(l)) \quad (9)$$

As described above, a composite signature vector may be generated based on key-value pairs of radio scenes captured at different reference times and may incorporate aliasing across similarly located transmitters. The composite signature may be associated with connectivity information and stored in a corpus. Moreover, multiple users can make such measurements. Thus a whole corpus of data consisting of a large number, for example, thousands, hundreds of thousands, millions or more, of connectivity predictors of composite signatures and associated future connectivity information will be available. The collection of connectivity predictors provides a corpus:

$$C = \{(s, cp)\}, \quad (10)$$

where:
s is a composite signature vector of a plurality of radio scenes; and
cp is future connectivity information.

It is assumed that the corpus C obeys a joint density p=(s, cp)=p(s)p(cp|s). That is the points in C are drawn independently, and identically distributed from p(s,cp) by nature. This may be written mathematically by the notation:

$$C \sim p(s, cp), \quad (11)$$

Assuming the corpus provides an exact understanding of p(s,cp), a prediction for the user's future connectivity can be provided by:

$$c\hat{p}AP_{arg\ max} = \arg\max_{cp}[p(cp|s)], \quad (12)$$

The above equation (12) assumes a complete knowledge of p(s,cp) from an infinite corpus; however, a complete knowledge of p(s,cp) is not possible from a finite corpus C, and as such it is necessary to provide an estimate of p(s,cp). It is possible to provide an estimate of p(s,cp) using a model based approach. However, the model based approach would provide a simplistic model since it typically ignores effects such as fast fading, multi-path and occlusions. A model that accounts for such effects would require a large number of additional parameters and as such becomes difficult to solve. As such, a non-model based approach for estimating p(s,cp) is required.

An estimate of p(s,cp) may be obtained directly from the corpus itself via a "frequency" interpretation of probability. This ensures that the resulting connectivity predictions do not suffer from systematic modeling errors.

In providing an estimate of p(s,cp) using a model-free approach, any side information that is available regarding the density p(s,cp) is thrown away and not used. As a result such methods do not make as efficient use of the available data as do the model-based methods. However, the current application may use an asymptotically infinite amount of data since millions of users may provide connectivity predictors every day and the data keeps building up. As a result, concerns of data paucity are not justified, and the model-free approach quickly becomes suitable as the size of the corpus grows.

A further concern of the model-free approach is the computational complexity of the approach, which scales linearly with the size of the corpus. This linear scaling is in contrast to the model based approach which has a constant computational complexity. However, the size of the corpus may be maintained to provide an acceptable amount of information on p(s,cp), while still maintaining the computational complexity at a manageable level.

In the following description of the model-free approach the following notation is used. For any vector a let $a_i$ denote the i-th element of a. Let $B_{\delta,\epsilon}^{\infty}(s,cp)$ denote an $L^{\infty}$ ball, i.e. a hypercube, around (s,cp) defined as:

$$B_{\delta,\epsilon}^{\infty}(s, cp) \equiv \left\{s', cp': \max_i |s_i - s_i'| \leq \delta, \max_i |cp_i - cp_i'| \leq \epsilon\right\} \quad (13)$$

Analogously the balls $B_{\epsilon}^{\infty}(cp)$ and $B_{\delta}^{\infty}(s)$ are defined as:

$$B_{\epsilon}^{\infty}(cp) \equiv \left\{cp': \max_i |cp_i - cp_i'| \leq \epsilon\right\} \quad (14)$$

$$B_{\delta}^{\infty}(s) \equiv \left\{s', cp': \max_i |s_i - s_i'| \leq \delta\right\} \quad (15)$$

Note that $B_{\delta,\epsilon}^{\infty}(s,cp)$, $B_{\epsilon}^{\infty}(cp)$ and $B_{\delta}^{\infty}(s)$ live in distinct spaces. Let $C|B_{\delta,\epsilon}^{\infty}(s,cp)$ be the restriction of the corpus C to the ball $B_{\delta,\epsilon}^{\infty}(s,cp)$, which can be obtained by throwing away all the elements that are outside the ball. Let $C|B_{\epsilon}^{\infty}(cp)$ be the restriction of the corpus C such that any point whose cp-coordinate is not in the ball $B_{\epsilon}^{\infty}(cp)$ is discarded. Finally, suppose $A \subseteq C$ is any subset of the corpus C. Then let $A_s$ denote a set of points in the s-space obtained by taking the s-component of every component in the set A.

With the above, the basic premise of the model-free approach is the frequency interpretation of probability, which is a consequence of the strong law of large numbers and the definition of the probability "density":

$$p(s, cp) = \lim_{\substack{N \to \infty \\ \delta,\epsilon \to 0}} \frac{|C|B_{\delta,\epsilon}(s, cp)|}{N\ Vol[B_{\delta,\epsilon}(s, cp)]}, \quad (16)$$

Equation (11) implies that:

$$p(s|cp) = \lim_{\substack{N \to \infty \\ \delta,\epsilon \to 0}} \frac{|C|B_{\delta,\epsilon}(s, cp)|}{|C|B_{\epsilon}(cp)|Vol[B_{\delta,\epsilon}(s, cp)]}, \quad (17)$$

And:

$$C\big|B_{\epsilon}(cp)_{cp} \underset{\epsilon \to 0}{\sim} p(s, cp), \quad (18)$$

Equation (18) provides that the set of points $C|B_{\epsilon}(cp)_{cp}$ is in the limit distributed according to the aposteriori density p(s,cp). Consequently, any statistical operation that needs to be performed using p(s|cp) can be performed simply by using the samples in $C|B_{\epsilon}(cp)_{cp}$. Thus, for example, the future connectivity information provided by equation (12) may use the points in $C|B_{\epsilon}(cp)_{cp}$. Of course since in practice the corpus size N is finite, the number of points in $C|B_{\epsilon}(cp)_{cp}$ is limited. With a small enough $\epsilon$, the set $C|B_{\epsilon}(cp)_{cp}$ becomes empty and hence $\epsilon$ cannot really go to zero. As such, the above sample based calculation, for some $\epsilon > 0$ will be an approximation, albeit typically a very good one.

From the above, it is clear that the future connectivity information may be retrieved from the corpus C based on a similarity or closeness of a query composite signature is to the composite signatures in the corpus. Once the connectivity information is retrieved, a prediction of the future connectivity needs to be determined. This may be done by calculating a histogram of the retrieved future connectivity information. The histogram can then be normalized to sum to one, and then the bucket of the histogram that has the largest count can be used as the prediction for future connectivity. Once a prediction of the future connectivity is determined, a probability of the prediction being wrong can be determined.

Figure 9:
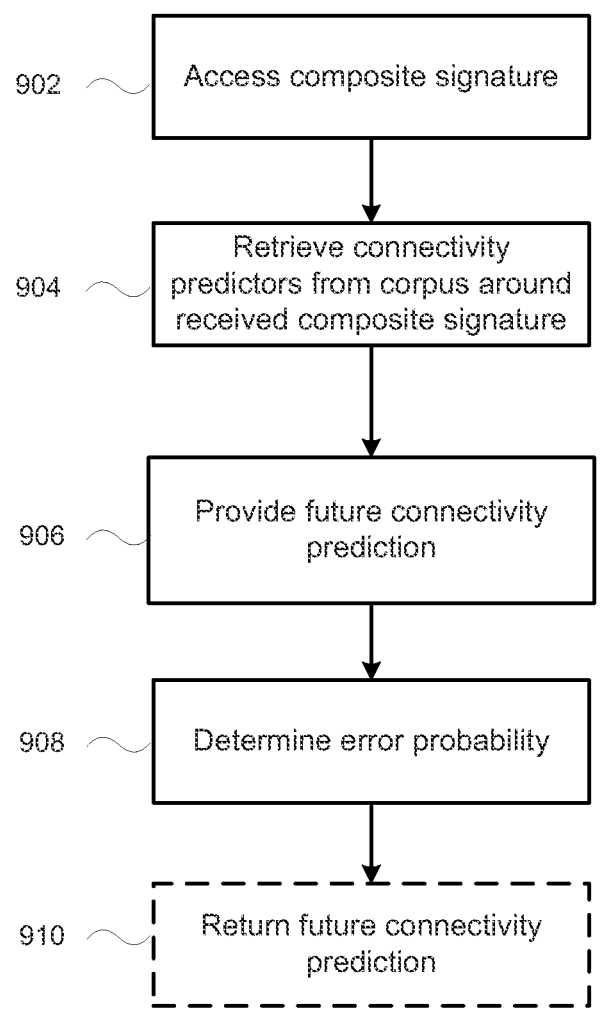
FIG. 9 depicts an illustrative method of predicting future radio connectivity of a portable electronic device.

FIG. 9 depicts an illustrative method 900 of predicting future radio connectivity of a portable electronic device. A composite signature is accessed (902). Accessing the composite signature vector may include receiving the composite signature vector from the portable electronic device or receiving the radio scene information to subsequently generate the composite signature vectors. The composite signature is used to query the corpus of connectivity predictors. The composite signature comprises a signature of a plurality of radio scenes seen by the portable electronic device at predetermined time intervals in the past. For example, the composite signature may comprise a signature of a currently visible radio scene, as well as radio scenes visible, 1, 2, 4, 8, 16 and 32 seconds ago. The composite signature may be generated at the portable electronic device, at a server or other remote computer from the plurality of radio scenes which may be sent by the portable electronic device. Regardless of where the composite signature is generated, it is used to retrieve one or more connectivity predictors from the corpus (904). The connectivity predictors may be retrieved by comparing the query composite signature to the composite signatures in the corpus. The connectivity predictors of the corpus that have composite signatures that are close or similar to the query composite signature are retrieved. As will be appreciated, the determination of how close or similar the composite signatures should be in order to retrieve the connectivity predictor may vary. For example, if there are a large number of similar composite vectors, the similarity may be increased, so that for example, only the closest 5 composite signatures are used in retrieving the connectivity predictors. If there are few composite signature vectors that are similar, the level of similarity may be relaxed so that additional connectivity predictors are retrieved. The connectivity predictors may be retrieved by constructing the set $A=C|B_\epsilon(s)_{cp}$ for some small $\epsilon$. If the set is empty a progressively larger $\epsilon$ may be used until A is well populated. Once the connectivity predictors are retrieved, future connectivity prediction of the portable electronic device can be provided based on the one or more retrieved connectivity predictions (906). For example, a histogram h of the connectivity information of the retrieved connectivity predictors is generated and normalized. Individual histogram buckets may be provided for each possible mobile radio, or groups of one or more radios may be combined in a single bucket. The connectivity information for the radios may then be determined from the histogram. For example, the bucket of the histogram that has the largest count may be selected as the connectivity prediction $$c\hat{p}AP_{arg\ max} = \arg\max_{cp'} h(cp').$$

Once the connectivity prediction is determined, an associated error, or probability that the prediction is mistaken can be determined (908). The probability can be determined from the entropy of the histogram h, according to:

$$H(h) = -\sum_{\hat{c}p \in A} h(cp')\log_2 h(cp') \quad (19)$$

Once the entropy is determined, the probability $P_e$ that the prediction is mistaken may be determined via the weakened Fano inequality:

$$P_e \geq \frac{H(h)-1}{\log_2 |A|} \quad (20)$$

Once the connectivity prediction is determined, it can be returned to the portable electronic device, along with the error probability (910). The connectivity prediction may then be used by the portable electronic device for a variety of purposes. For example, before entering a subway train or a plane, the portable electronic device receives a connectivity prediction indicating a loss of data connectivity or GPS availability. The portable electronic device may then automatically download some electronic assets like emails, attachments, documents, music and relevant new stories. The downloaded assets may then be browsed during the data connectivity blackout. As a further example, while watching a streaming video or audio, the portable electronic device may receive an connectivity prediction indicating a temporary loss of connectivity and may signal to the streaming server to increase the transmission rate in order to buffer enough footage, or audio, to play during the anticipated blackout. As a further example, if the connectivity prediction indicates that free Wi-Fi connectivity will be available shortly, uploading of large files, such as videos or pictures, may be temporarily delayed. As a further example, if the connectivity prediction provides an indication that the GPS radio will not have any connection, the GPS chip may be turned off to conserve power. As a further example, if the connectivity prediction indicates that Wi-Fi connectivity will be lost, the portable electronic device may take actions such as transferring a Wi-Fi call over to a cellular connection that has connectivity.

Figure 10:
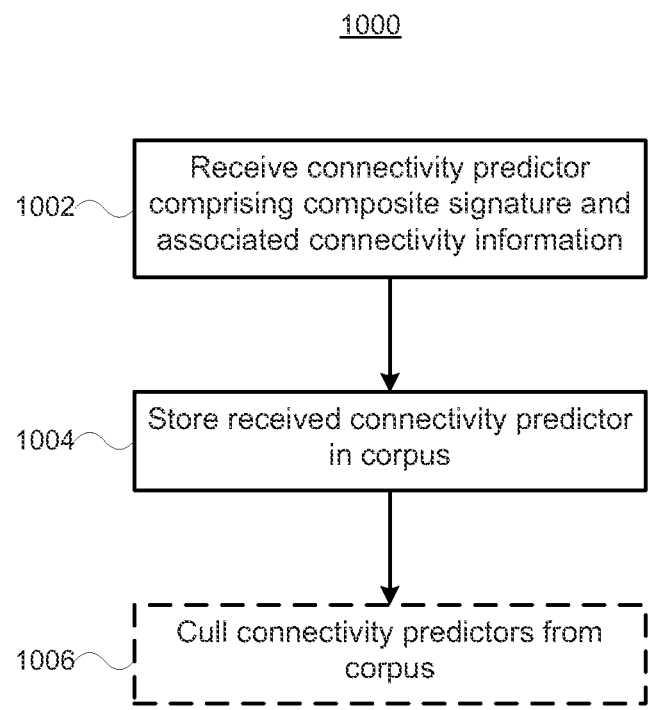
FIG. 10 depicts a method of maintaining a corpus of connectivity predictors.

FIG. 10 depicts a method of maintaining a corpus of connectivity predictors. The method 1000 may be used to maintain the corpus used in predicting future connectivity of portable electronic devices as described above. The method 1000 may be provided by the execution of instructions, stored in memory, by a processor of the location estimation server described above.

The method 1000 receives a connectivity predictor, comprising a composite signature and associated connectivity information (1002). The connectivity information may be determined by a portable electronic device using the various receivers including a GPS receiver, Wi-Fi receiver, cellular receiver. The composite signature is generated from a plurality of radio scenes seen at previous times and each comprising one or more key-value pairs of transmitter IDs and RSSI values. The composite signature may be generated from the plurality of radio scenes at the portable electronic device or at the connectivity prediction server. Once the connectivity predictor is received the method stores the connectivity predictor in the corpus (1004). The corpus may also store a time or date associated with when the connectivity predictor was collected.

The method may further comprise culling older connectivity predictors from the stored corpus (1006). The culling of connectivity predictors may be done periodically, for example, once a month, once a week, once a day, once an hour or at other frequencies. Additionally or alternatively, the connectivity predictors may be culled when the corpus exceeds a particular size. Further, older connectivity predictors may be culled from the corpus as new connectivity predictors are stored. The culling of the older connectivity predictors may be done based solely on the associated age of the connectivity predictors, so that the oldest connectivity predictor is culled first. Alternatively, the connectivity predictors may be culled based on the age of the connectivity predictors, as well as the amount of connectivity predictors associated with a particular area, so that old connectivity predictors associated with areas having little connectivity predictors are not culled from the corpus, while relatively newer connectivity predictors associated with areas with a relative abundance of connectivity predictors are culled from the corpus.

Figure 11:
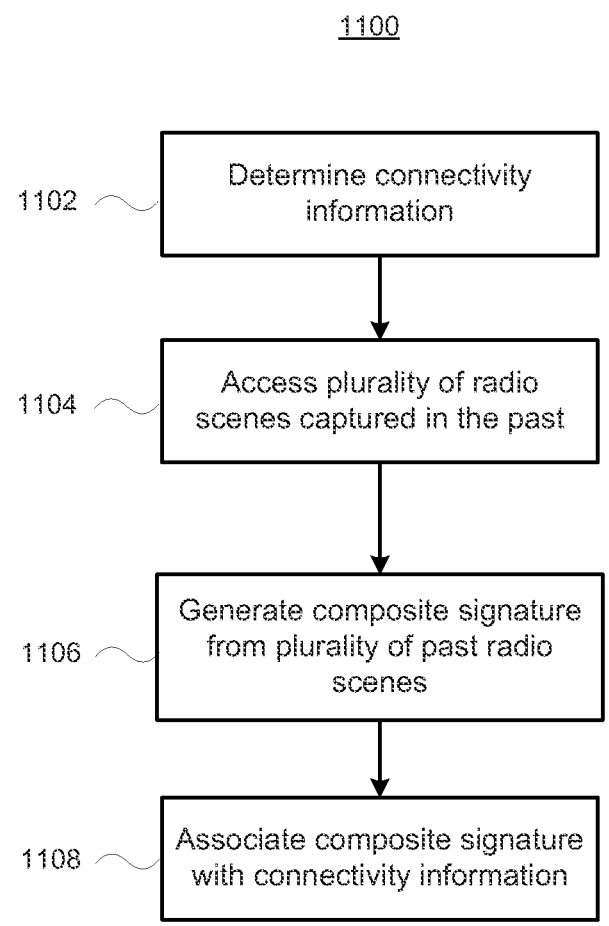
FIG. 11 depicts an illustrative method of generating a connectivity predictor.

FIG. 11 depicts an illustrative method of generating a connectivity predictor. The generated connectivity predictor may be stored in the corpus as described above. The method of generating a connectivity predictor may be implemented at a portable electronic device, or at a combination of the portable electronic device and a remote location. The method 1100 determines connectivity information at the portable electronic device. The connectivity information indicates whether or not a particular radio of the portable electronic device has connectivity. For example, if the portable electronic device has a cellular radio, a Wi-Fi radio and a GPS receiver, the connectivity information may be a tuple of binary values indicating whether or not each radio has connectivity. Alternatively, each radio may be associated with a value indicating available connectivity information. For example, the value of the cellular radio may indicate whether it is a 3G or 4G connection. Similarly, the Wi-Fi information may indicate whether it is a free connection or not. The connectivity information may be determined periodically, for example every 30 seconds, or may be determined only when a change in the connectivity is detected. Once the connectivity information is determined, previously captured radio scenes, or radio scene signatures are accessed (1104). The previously captured radio scenes are radio scenes that were seen at predetermined time intervals in the past. When the radio scenes are captured, they may be stored temporarily, either as a set of key-value pairs of visible transmitters, or as some other convenient structure. Once the radio scenes are accessed, they are used to generate a composite signature (1106). The composite signature may be generated using a compressed sensing signature technique described above, and in particular with reference to FIG. 8. Once the composite signature is generated it is associated with the connectivity information (1108). The connectivity predictor may be stored in the corpus. As will be appreciated, the current connectivity information is associated with a plurality of past radio scenes of the composite signature. As a result, if the composite signature is matched to a current signature, the associated connectivity information may be used as a prediction of the future connectivity of the portable electronic device.

Figure 12:
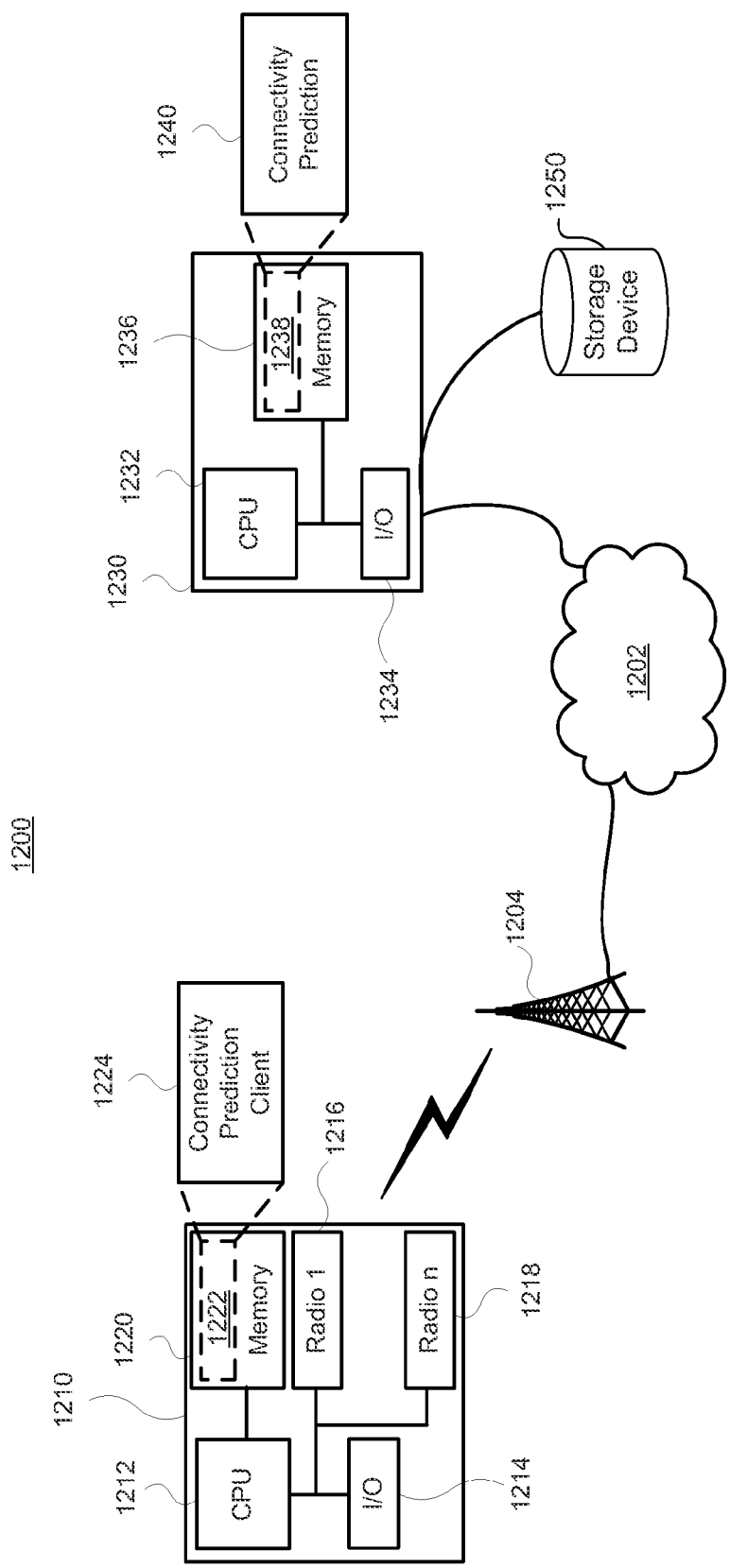
FIG. 12 depicts an illustrative environment in which the future connectivity prediction described herein may be used.

FIG. 12 depicts an illustrative environment in which the future connectivity prediction described herein may be used. The environment 1200 includes various components coupled together by a network 1202 or networks, including a cellular infrastructure 1204. A portable electronic device 1210 may communicate over the cellular infrastructure 1204 and network 1202 with other components, including a connectivity prediction server 1230.

The portable electronic device 1210 comprises a processor (CPU) 1212 for executing instructions. The portable electronic device 1210 may include one or more input/output components 1214 including a display, keyboard, touch input, touch screen, camera, microphone speaker, and other sensors or actuators. The portable electronic device may include one or more radios 1216, 1218, including a GPS receiver, Cellular radio, Wi-Fi radio WiMax radio or other types of wireless radios. The portable electronic device 1210 includes a memory 1220 that stores data and instructions 1222. The instructions 1222 when executed by the processor 1212 configure the portable electronic device 1210 to provide various functionality, including functionality of a connectivity prediction client 1224. The connectivity prediction client may periodically generate connectivity predictors as described above for storage at the connectivity prediction server 1230. The connectivity prediction client may also comprise functionality for periodically generating a query composite signature of radio scenes and provide it to the connectivity prediction server 1230. The connectivity prediction client may further include functionality for taking one or more actions based on the predicted future connectivity, such as delaying transferring of information; increasing a transfer rate of information; and turning on or off one or more components of the portable electronic device 1210.

The connectivity prediction server 1230 comprises a processor (CPU) 1232 for executing instructions. The connectivity prediction server 1230 may include one or more input/output components 1234 such as a network interface. Other I/O components may include display, keyboard, touch input, touch screen, camera, microphone speaker, and other sensors or actuators. The connectivity prediction server 1230 includes a memory 1236 that stores data and instructions 1238. The instructions 1238 when executed by the processor 1232 configure the connectivity prediction server 1230 to provide various functionality, including connectivity prediction functionality 1240. The connectivity prediction functionality may include functionality for maintaining a corpus of connectivity predictors and functionality for providing a prediction of future connectivity for a portable electronic device 1210 based on a query composite signature. The connectivity prediction functionality may also include functionality for generating a composite signature from a plurality of radio scenes and to store or retrieve data from a storage device 1250 either coupled to the connectivity prediction server 1230 local or via a network 1202. Although the connectivity prediction server 1230 is described as a single server the functionality may be disturbed between a plurality of processor with the server or a plurality of servers either coupled in a local area network or distributed through a network 'cloud' environment.

The above has described the prediction of future connectivity of a portable electronic device based on a composite signature of radio scenes. Each radio scene has been described as being a unique ID of a transmitter. It was assumed in the above description, that only a single type of transmitters, such as cellular transmitters identified by a 64 bit identifier composed of a cell id, a mobile country code, a mobile network code and a location area code, were incorporated into the signature. It is possible to include different types of transmitters, such as Wi-Fi access points into the radio scenes and composite signatures, however, identifiers need to be unique across all of the components included in the radio scene signature. If both Wi-Fi access points and cellular transmitters are included in the radio scene, each of which may be identified by a 64 bit identifier, the unique identifier can be composed as the transmitter identifier, which is unique for the cellular transmitters and Wi-Fi transmitters respectively and a transmitter type identifier, which could be a single bit indicating whether the following 64 bits are a cellular transmitter ID or a Wi-Fi transmitter ID.

Further, if different types of transmitters are included in the radio scenes and composite signatures, the signal strength value should be normalized to an expected power of each transmitter type. For example, cellular transmitters operate at much higher power levels than Wi-Fi transmitters. Normalizing the values allows each to be accounted for equally in the radio scene or composite signature.

Further, the composite signatures could incorporate additional information from sensors of the portable electronic device. For example, speed information, latitude and longitude information, sound information, compass information or information from other sensors could be included in the composite signature. Conceptually, the sensor data could be identified with a unique identifier and appended to the end of the concatenated radio scene vectors. The values of the sensors could be scaled appropriately for use with the radio scene information.

The above has referred to 64-bit MAC addresses as being used for generating the compressed sensing signature. It is noted that 48-bit MAC address are also commonly used. It is possible to generate a compressed sensing signature using both 64-bit and 48-bit addresses. One technique is to convert the 48-bit MAC address into a 64-bit MAC address. A 64-bit MAC address can be generated from a 48-bit MAC address by inserting two defined padding bytes, namely "FF" and "FE" in hexadecimal, between the first three bytes, which may form the organizationally unique identifier (OUI) and the last three bytes, which may provide an identifier that is uniquely assigned by the manufacturer. As such, a 48-bit MAC address of AC-DE-48-23-45-67 can be converted to the 64-bit MAC address AC:DE:48:FF:FE:23:45:67. The compressed sensing signature may be generated from the 64-bit address, regardless of if it is a 64-bit MAC address or a padded 48-bit MAC address.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the description discloses example methods, system and apparatus including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods and apparatus, persons having ordinary skill in the art will readily appreciate that the examples provided are not the only way to implement such methods and apparatus.

What is claimed is:

1. A method of predicting future connectivity of a portable electronic device comprising:
    accessing a query composite signature vector providing an indication of a plurality of radio scenes detected at the portable electronic device at a plurality of respective predetermined reference times, each radio scene identifying transmitters and associated signal strength of signals received by the portable electronic device at a respective predetermined reference time of the plurality of respective predetermined reference times;
    retrieving one or more connectivity predictions from a corpus of pairs of: a composite signature vector, providing an indication of a plurality of radio scenes detected at one or more different portable electronic device at the plurality of respective predetermined reference times, and associated connectivity information, each of the one or more connectivity predictions retrieved based on a similarity between the composite signature vector and the query composite signature vector, wherein each of the one or more retrieved connectivity predictions comprises a composite signature vector and associated connectivity information from the corpus of pairs; and
    providing a prediction of future connectivity of the portable electronic device based on the one or more retrieved connectivity predictions.

2. The method of claim 1, wherein each of the radio scenes detected at the portable electronic device at the respective predetermined reference time comprises a plurality of key-value pairs, each associated with the respective predetermined reference time the radio scene was detected at, wherein the method further comprises:
    accessing a plurality of key-value pairs, each comprising a respective key, corresponding to a unique transmitter identifier, and a value associated with a signal strength from the respective transmitter received at the portable electronic device at one of the plurality of respective predetermined reference times; and
    calculating each vector element based on a summation of a plurality of terms, each term calculated from a respective key-value pair by:
        generating a seed based on (i) the key of the respective key-value pair, (ii) an element identifier associated with the vector element being calculated and (iii) a reference time identifier of the respective predetermined reference time associated with the respective key-value pair.

3. The method of claim 2, wherein at least one of the keys of the plurality of key-value pairs is associated with one or more synonymous unique identifiers of transmitters located in close proximity to each other, wherein when the key of the respective key-value pair is associated with one or more synonymous unique identifiers, the term in the summation calculated by further adding one or more sub-terms, each calculated from a respective synonymous unique identifier of the one or more synonymous unique identifiers associated with the key of the respective key-value pair by:
    generating a synonym seed based on (i) the respective synonymous unique identifier (ii) the element identifier associated with the vector element being calculated and (iii) the reference time identifier of the respective predetermined reference time associated with the respective key-value pair;
    generating a synonym pseudo-random number from the generated synonym seed; and
    multiplying the synonym pseudo-random number by the value of the respective key-value pair.

4. The method of claim 2, wherein the received indication of the plurality of radio scenes detected at the portable electronic device comprises a composite signature generated at the portable electronic device.

5. The method of claim 2, wherein the received indication of the plurality of radio scenes detected at the portable electronic device comprises the plurality of key-value pairs each associated with the respective predetermined reference time.

6. The method of claim 1, wherein providing a prediction of future connectivity further comprises generating a histogram of the associated connectivity information of the one or more retrieved connectivity predictions and normalizing the histogram.

7. The method of claim 6, wherein providing future connectivity prediction further comprises determining an entropy error probability of the histogram, and a weakened Fano inequality.

8. The method of claim 1, further comprising culling older connectivity predictors from the corpus at periodic intervals.

9. The method of claim 1, further comprising disabling one or more resources of the portable electronic device in response to the future connectivity prediction.

10. The method of claim 9, wherein the resource is a global positioning receiver (GPS).

11. The method of claim 9, wherein the resource is a wireless interface.

12. The method of claim 1, further comprising requesting a radio frequency resource in response to the future connectivity prediction.

13. The method of claim 1, wherein transmitters are identified in the composite radio scene signature by a unique radio frequency (RF) transmitter address comprising a media access control (MAC) address or cellular transmitter identifier.

14. A device for predicting future connectivity of a portable electronic device comprising:
  a memory containing instructions; and
  a processor for executing the instructions, the instructions when executed by the processor configuring the device to:
    access a query composite signature vector providing an indication of a plurality of radio scenes detected at the portable electronic device at a plurality of respective predetermined reference times, each radio scene identifying transmitters and associated signal strength of signals received by the portable electronic device at a respective predetermined reference time of the plurality of respective predetermined reference times;
    retrieve one or more connectivity predictions from a corpus of pairs of: a composite signature vector, providing an indication of a plurality of radio scenes detected at one or more different portable electronic device at the plurality of respective predetermined reference times, and associated connectivity information, each of the one or more connectivity predictions retrieved based on a similarity between the composite signature vector and the query composite signature vector, wherein each of the one or more retrieved connectivity predictions comprises a composite signature vector and associated connectivity information from the corpus of pairs; and
    provide a prediction of future connectivity of the portable electronic device based on the one or more retrieved connectivity predictions.

15. The device of claim 14, wherein each of the radio scenes detected at the portable electronic device at the respective predetermined reference time comprises a plurality of key-value pairs, each associated with the respective predetermined reference time the radio scene was detected at, wherein the executed instructions configure the device to further:
  access a plurality of key-value pairs, each comprising a respective key, corresponding to a unique transmitter identifier, and a value associated with a signal strength from the respective transmitter received at the portable electronic device at one of the plurality of respective predetermined reference times; and
  calculate each vector element based on a summation of a plurality of terms, each term calculated from a respective key-value pair by:
    generate a seed based on (i) the key of the respective key-value pair, (ii) an element identifier associated with the vector element being calculated and (iii) a reference time identifier of the respective predetermined reference time associated with the respective key-value pair.

16. The device of claim 15, wherein at least one of the keys of the plurality of key-value pairs is associated with one or more synonymous unique identifiers of transmitters located in close proximity to each other, wherein when the key of the respective key-value pair is associated with one or more synonymous unique identifiers, the term in the summation calculated by further adding one or more sub-terms, each calculated from a respective synonymous unique identifier of the one or more synonymous unique identifiers associated with the key of the respective key-value pair by:
  generating a synonym seed based on (i) the respective synonymous unique identifier (ii) the element identifier associated with the vector element being calculated and (iii) the reference time identifier of the respective predetermined reference time associated with the respective key-value pair;
  generating a synonym pseudo-random number from the generated synonym seed; and
  multiplying the synonym pseudo-random number by the value of the respective key-value pair.

17. The device of claim 14, wherein the received indication of the plurality of radio scenes detected at the portable electronic device comprises a composite signature generated at the portable electronic device.

18. The device of claim 14, wherein the received indication of the plurality of radio scenes detected at the portable electronic device comprises the plurality of key-value pairs each associated with the respective predetermined reference time.

19. The device of claim 14, wherein providing a prediction of future connectivity further comprises determining an entropy error probability of the histogram, and a weakened Fano inequality.

20. The device of claim 14, wherein the instructions further configure the device to cull older connectivity predictors from the corpus at periodic intervals.

21. The device of claim 14, further comprising disabling one or more resources of the portable electronic device in response to the future connectivity prediction.

22. The device of claim 14, wherein the resource is a global positioning receiver (GPS).

23. The device of claim 14, wherein the resource is a wireless interface.

24. The device of claim 14, further comprising requesting a radio frequency resource in response to the future connectivity prediction.

25. The device of claim 14, wherein transmitters are identified in the composite radio scene signature by a unique radio frequency (RF) transmitter address comprising a media access control (MAC) address or cellular transmitter identifier.

26. The device of claim 14, wherein providing a prediction of future connectivity further comprises generating a histogram of the associated connectivity information of the one or more retrieved connectivity predictions and normalizing the histogram.

27. A non-transitory computer readable memory containing instructions for predicting future connectivity of a portable electronic device, the instructions which when executed by a processor perform the method of:

accessing a query composite signature vector providing an indication of a plurality of radio scenes detected at the portable electronic device at a plurality of respective predetermined reference times, each radio scene identifying transmitters and associated signal strength of signals received by the portable electronic device at a respective predetermined reference time of the plurality of respective predetermined reference times;

retrieving one or more connectivity predictions from a corpus of pairs of: a composite signature vector, providing an indication of a plurality of radio scenes detected at one or more different portable electronic device at the plurality of the respective predetermined reference times, and associated connectivity information, each of the one or more connectivity predictions retrieved based on a similarity between the composite signature vector and the query composite signature vector, wherein each of the one or more retrieved connectivity predictions comprises a composite signature vector and associated connectivity information from the corpus of pairs; and providing a prediction of future connectivity of the portable electronic device based on the one or more retrieved connectivity predictions.

* * * * *